US008873978B2

(12) United States Patent
Oda et al.

(10) Patent No.: US 8,873,978 B2
(45) Date of Patent: Oct. 28, 2014

(54) DEVELOPER ACCOMMODATION UNIT, DEVELOPMENT DEVICE, IMAGE FORMING APPARATUS, AND DEVELOPER SUPPLY CONTAINER

(75) Inventors: Yukiyoshi Oda, Tokyo (JP); Ken Nozawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 273 days.

(21) Appl. No.: 13/490,496

(22) Filed: Jun. 7, 2012

(65) Prior Publication Data

US 2012/0328307 A1 Dec. 27, 2012

(30) Foreign Application Priority Data

Jun. 21, 2011 (JP) ................................ 2011-137509

(51) Int. Cl.
*G03G 15/08* (2006.01)
*G03G 21/16* (2006.01)

(52) U.S. Cl.
CPC ........ *G03G 15/0886* (2013.01); *G03G 21/1647* (2013.01); *G03B 15/0889* (2013.01)
USPC ............................................ 399/27; 399/258

(58) Field of Classification Search
USPC ........................................... 399/27, 258, 263
See application file for complete search history.

(56) References Cited

U.S. PATENT DOCUMENTS 7,738,817 B2 * 6/2010 Sasae et al. .................. 399/258
2008/0124119 A1 * 5/2008 Oda .......................... 399/263 X
2012/0251186 A1 * 10/2012 Arai ............................ 399/260

FOREIGN PATENT DOCUMENTS

JP A-2006-023537 1/2006
JP 2006-243763 A 9/2006
JP 2008-164798 A 7/2008

* cited by examiner

*Primary Examiner* — Sandra Brase
(74) *Attorney, Agent, or Firm* — Muncy, Geissler, Olds & Lowe, P.C.

(57) ABSTRACT

A developer accommodation unit includes a developer accommodation part that accommodates a developer, an opening part that communicates with the developer accommodation part, a shutter member that is movable between an opened position and a closed position with respect to the opening part, a rotation body that is provided rotatable in the developer accommodation part, and a drive force transmission mechanism that transmits a drive force to the rotation body so that the rotation body rotates. The drive force transmission mechanism includes an engagement mechanism by which the drive force is transmitted to the rotation body when the shutter member is in the opened position.

21 Claims, 36 Drawing Sheets

Fig. 23A Enough Remaining Toner Amount
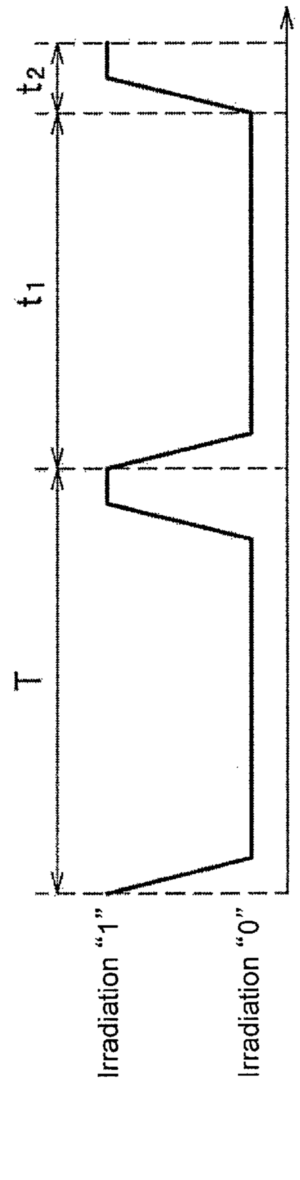
Fig. 23B Low Remaining Toner Amount
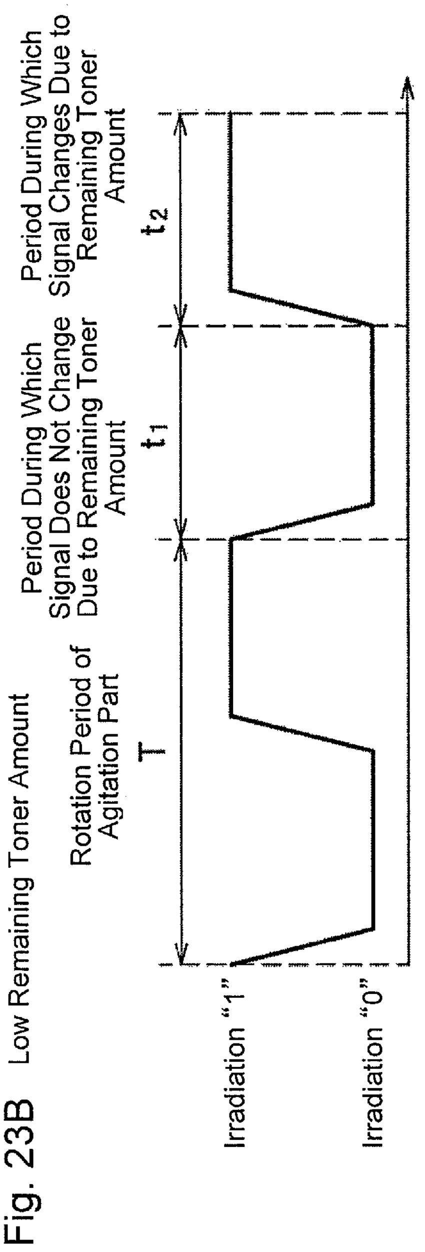

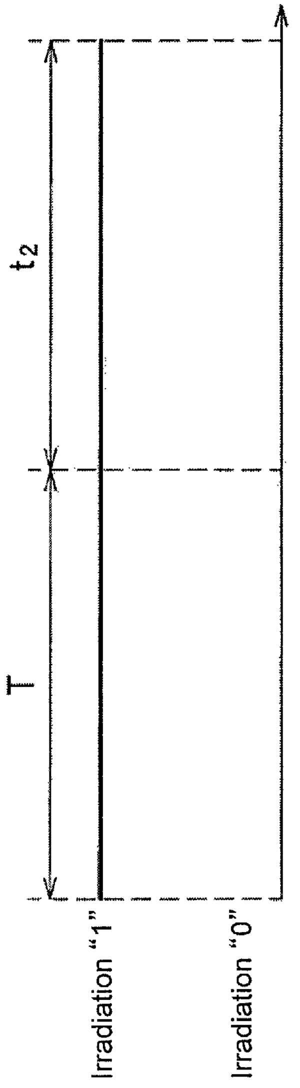
Fig. 24A When Light Receiving Signal Is Continuously Received
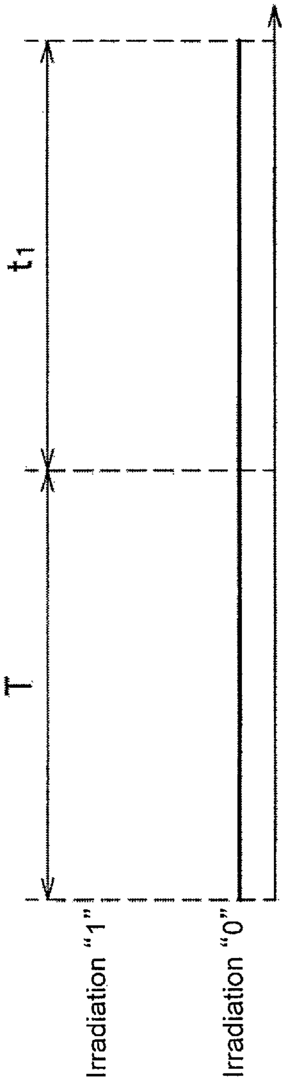
Fig. 24B When Light Receiving Signal Is Not Continuously Received

DEVELOPER ACCOMMODATION UNIT, DEVELOPMENT DEVICE, IMAGE FORMING APPARATUS, AND DEVELOPER SUPPLY CONTAINER

CROSS REFERENCE TO RELATED APPLICATION

The present application is related to, claims priority from and incorporates by reference Japanese Patent Application No. 2011-137509, filed on Jun. 21, 2011.

TECHNICAL FIELD

This application relates to a developer accommodation unit, a development device, an image forming apparatus using the development device, and developer supply container.

BACKGROUND

Conventionally, an image forming apparatus, such as a printer, a photocopy machine, a facsimile device, a multifunction peripheral that includes a printer part and a scanner part, and the like, forms an electrostatic latent image by uniformly and evenly charge a surface of a photosensitive body and by exposing the charged surface, and forms a toner image by attaching developer (toner) on the electrostatic latent image. Then, an image is formed by transferring and fixing the toner image onto a sheet.

In such conventional image forming apparatus, a remaining toner amount detection mechanism is provided that detects a remaining toner amount (or amount of toner remaining) in a development device. The remaining toner amount detection mechanism is a rotation body that falls by own weight (free-falls) to a surface of the toner from a predetermined height when the remaining toner amount is low. The image forming apparatus detects the remaining toner amount by a length of time in which the rotation body that is the remaining toner amount detection mechanism free-falls (see JP Laid-Open Patent Application No. 2006-23537 (paragraphs 0021-0024)).

However, when the toner does not move, the rotation body in the development device may unnecessarily rotate.

One of objects of the present invention is to prevent the rotation body inside the development device from unnecessarily rotating.

SUMMARY

In order to achieve one or some of the objects, a developer accommodation unit of the present invention includes a developer accommodation part that accommodates a developer; an opening part that communicates with the developer accommodation part, and through which the developer is supplied to the developer accommodation part; a shutter member that is configured to be movable between an opened position and a closed position with respect to the opening part, wherein when the shutter member is located in the opened position, the developer is capable of moving to the developer accommodation part through the opening part, and when the shutter member is located in the closed position, the developer is blocked by the shutter member from moving into the accommodation part; a rotation body that is provided rotatable in the developer accommodation part; and a drive force transmission mechanism that transmits a drive force supplied from an outside the developer accommodation unit to the rotation body so that the rotation body rotates. The drive force transmission mechanism includes an engagement mechanism by which the drive force is transmitted to the rotation body when the shutter member is in the opened position.

In other views, a development device, an image forming unit and an image forming apparatus that the developer accommodation unit above are also disclosed in the application.

In another view, an image forming unit of the present invention includes a developer supply container that accommodates a developer; a development device that accommodates the developer supplied from the developer supply container; a communication part which is provided between the developer supply container and the development device and through which the developer passes from the developer supply container to the development device; and a shutter mechanism that opens and closes the communication part, wherein the development device includes: a rotation body that is provided rotatably, and a drive force transmission mechanism that transmits a drive force to the rotation body. Wherein the drive force transmission mechanism includes an engagement mechanism by which the drive force is transmitted to the rotation body when the shutter member opens the communication part.

In another view, a developer accommodation unit of the present invention includes a controller; a developer accommodation part that accommodates a developer; a shutter member that opens and closes the developer accommodation part; a rotation body provided rotatable in the developer accommodation part; and a drive force transmission mechanism that transmits a drive force to the rotation body when the developer accommodation part is open. Wherein the rotation body free-falls from a top of rotation to a surface of the developer after the drive force transmission mechanism causes the rotation body to rotate and reach the top of rotation, and the controller determines a remaining toner amount by calculating time of the drive force transmission mechanism from the top of rotation to the rotation body on the surface of the developer after the free-fall.

In another view, a developer supply container of the present invention for accommodating a developer and for supplying the developer to an image forming apparatus to which the developer supply container is configured to be installed so that the image forming apparatus forms a developer image using the developer supplied from the developer supply container, includes a circumference part that accommodates the developer; a developer supply opening that is disposed at a lower part of the circumference part so that the developer moves through the developer supply opening to an outside the circumference part; a shutter member that is arranged at the opening part and that is configured to be movable between an opened position and a closed position with respect to the developer supply opening, wherein when the developer supply container is installed, the shutter member is located in the opened position so that the developer is capable of moving through the developer supply opening, and when the developer supply container is not installed, the shutter member is located in the closed position and the developer is blocked by the shutter member from moving through the developer supply opening; a rotation body that is provided rotatable in the circumference part and in the vicinity of the developer supply opening; and a drive force transmission mechanism that transmits a drive force supplied from an outside the developer supply container to the rotation body so that the rotation body rotates. Wherein the drive force transmission mechanism includes an engagement mechanism by which the drive force is transmitted to the rotation body when the shutter member is in the opened position.

According to an embodiment of the present invention, the rotation body inside the development device is prevented from unnecessarily rotating.

BRIEF DESCRIPTION OF THE DRAWINGS

FIG. 5A illustrates from one side with a deceleration gear 50 at the left side, FIG. 5B illustrates from the opposite side with the deceleration gear 50 at the right side in the sheet.

FIG. 6A illustrates from a top with ribs 76 at the lower part, FIG. 6B illustrates from a bottom with the ribs 76 at the upper part in the sheet.

FIG. 7A illustrates from one side, FIG. 7B illustrates from the opposite side.

FIG. 8A illustrates one side view. FIG. 8B illustrates another view from the opposite side.

FIGS. 23A and 23B are time charts (when there is enough remaining toner amount, and when the remaining toner amount is low) illustrating the time for the light receiving element that configures the detection mechanism according to the first embodiment to recognize light.

FIGS. 24A and 24B are time charts (in a state where the toner supply opening is closed) illustrating the time for the light receiving element that configures the detection mechanism according to the first embodiment to recognize light.

DETAILED DESCRIPTION OF EMBODIMENTS

Figure 1:
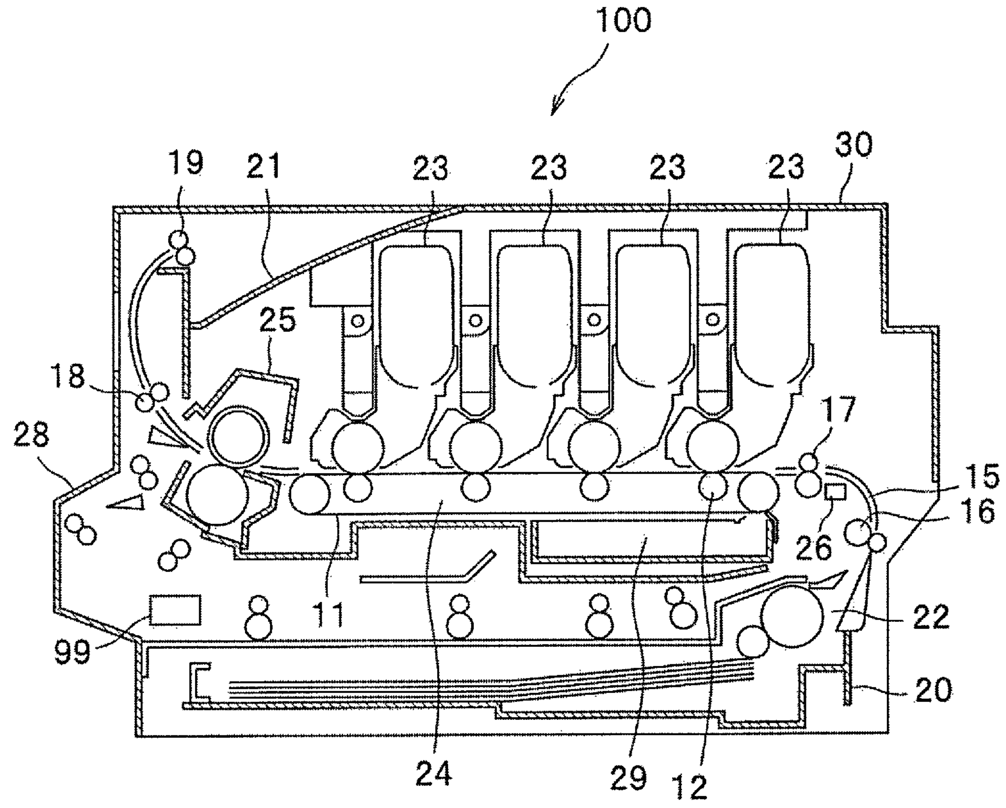
FIG. 1 is a vertical cross-sectional view (schematic) of an image forming apparatus according to a first embodiment.

Embodiments of the present application are described below in detail with reference to the drawings. Each drawing merely schematically illustrates the embodiments to allow sufficient understanding of the embodiments. Therefore, the embodiments are not limited to those shown in the drawings. In addition, dimensions of the members that configure the present application in the referenced figures may be enlarged to clarify the explanation. In addition, in each drawing, common and similar components are marked with the same symbols, and duplicative explanations are omitted. In the specification, unless specific definitions are present, up and upper mean a direction away from the ground along with the gravity direction. On the other hand, down and lower mean the opposite direction to the up direction, which is toward the ground along with the gravity.

First Embodiment

Configuration of Image Forming Apparatus According to First Embodiment

A configuration of an image forming apparatus according to a first embodiment is explained below with reference to FIGS. 1 to 25B. An image forming apparatus 100 according to the first embodiment is, for example, a printer, a photocopy machine, a facsimile device, a multifunction peripheral that includes a printer part and a scanner part, and the like. Here, the image forming apparatus 100 is assumed to be, and explained as, a color printer.

FIG. 1 is a vertical cross-sectional view (schematic) of an image forming apparatus according to a first embodiment. The image forming apparatus 100 shown in FIG. 1 includes a light emitting diode (LED) head 3 (see FIG. 2) as an exposure device, a sheet carrying path 15, medium carrying rollers 16, 17, 18 and 19, a sheet supply cassette 20, a stacker 21, a sheet feeding part 22, developer units 23 as development devices, a transfer belt unit 24, a fuser 25, a (sheet thickness) detection part 26, a lower frame 28, a top cover 30, and a controller 99. In addition, the transfer belt unit 24 includes a transfer belt 11 and transfer rollers 12.

The approximately S-shaped sheet carrying path 15 that includes the medium carrying rollers 16, 17, 18 and 19 is provided at the lower frame 28 of the image forming apparatus 100. The sheet supply cassette 20 that stores recording media and the stacker 21 is provided at ends of the sheet carrying path 15. The sheet feeding part 22 that feeds out a recording medium from the sheet supply cassette 20, the (sheet thickness) detection part 26 that detects a sheet thickness of the recording medium, the transfer belt unit 24 that adheres and carries the fed-out recording medium on the transfer belt 11 by an electrostatic effect, and the fuser 25 that fixes the toner on the recording medium are provided in the sheet carrying path 15. In addition, four development units 23 are arranged at positions to face the transfer belt unit 24 across the sheet carrying path 15.

Figure 2:
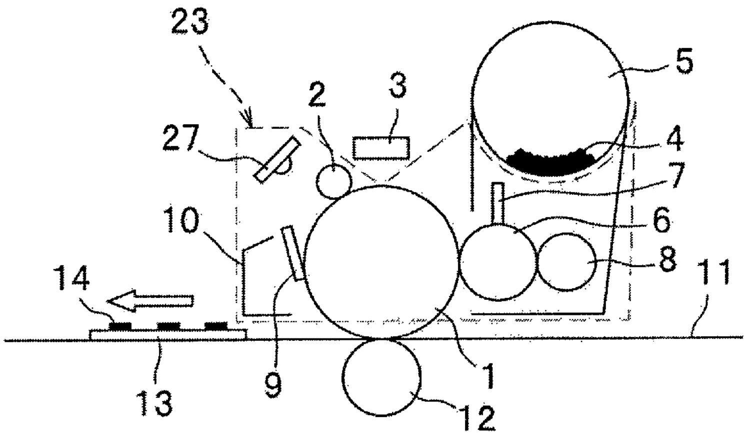
FIG. 2 is a main part enlarged vertical cross-sectional view (schematic) of the image forming apparatus according to the first embodiment.

FIG. 2 is a main part enlarged vertical cross-sectional view (schematic) of the image forming apparatus according to the first embodiment. Specifically, FIG. 2 schematically illustrates a development unit 23 and a transfer roller 12 of the image forming apparatus 100 shown in FIG. 1 and a printed recording medium 13. For the development unit 23, only a structure that relates to image formation is explained. The development unit 23 illustrated as the development device in FIG. 2 includes a photosensitive body 1 as a latent image carrier, a charging member 2, a development roller 6 (developer carrier), a development blade 7, a toner supply roller 8 (supply member) and a cleaning blade 9. A toner cartridge 5 (developer supply container) is installed on the development unit 23. In the present invention, the developer is not necessarily limited to a single compound, for example, carbon toner. The developer may be composed with two or more components, for example, a mixture of toner and carrier which is for example iron oxide. The iron oxide is commonly known as rust, and helping create the magnetic charge necessary to oppose the charge of the other toner. The latent image carrier is not necessarily in a circular shape (or drum shape) in its axis view. The carrier may be practical in an elliptic shape with a belt.

The photosensitive body 1 of the image forming apparatus 100 is rotatable at a predetermined rotational speed. A photosensitive layer that stores a charge is formed on the surface of the photosensitive body 1. The charge on the surface is removed by exposure. A predetermined voltage can be applied on the surface of the photosensitive body 1. The charging member 2 contacts the surface of the photosensitive body 1 at a certain pressure. The LED head 3 as an exposure device for forming an electrostatic latent image on the surface of the photosensitive body 1 is provided above the photosensitive body 1. The cleaning blade 9 made of an elastic body is provided such that an edge part for scraping the toner 4 contacts the surface of the photosensitive body 1 at a certain pressure. A charge removal part 27 is provided for removing the charge on the surface of the photosensitive body.

Moreover, the toner supply roller 8 for supplying on the development roller 6 the toner 4 supplied from the toner cartridge 5 is provided to the development roller 6 to contact the development roller 6 at a certain pressure. The development blade 7 is provided to the development roller 6 to regulate the toner supplied to the development roller 6 from the toner supply roller 8 at a certain thickness. A predetermined bias voltage is applied to the photosensitive body 1 and the development roller 6, and the toner 4 is moved to the photosensitive body 1 due to the electrostatic force.

The toner cartridge 5 that accommodates the toner is provided above the development unit 23. The toner 4 is supplied from the inside of the toner cartridge 5. The toner cartridge 5 and the development unit 23 may be collectively referred to as an image forming unit. In addition, in the present embodiment, the development unit 23 is configured with a developer accommodation unit, development roller, toner supply roller and photosensitive body and so on. A frame 10 configures an outer frame of the development unit 23. The transfer belt 11 and the transfer roller 12 are positioned below the photosensitive body 1. A voltage is applied to the transfer belt 11 and the transfer roller 12 by a power source (not shown), and thereby the toner 14 is transferred onto the recording medium 13.

<Development Unit>

Next, a detailed configuration of the development unit 23 as the development device shown in FIG. 2 to FIG. 7B is explained.

Figure 3:
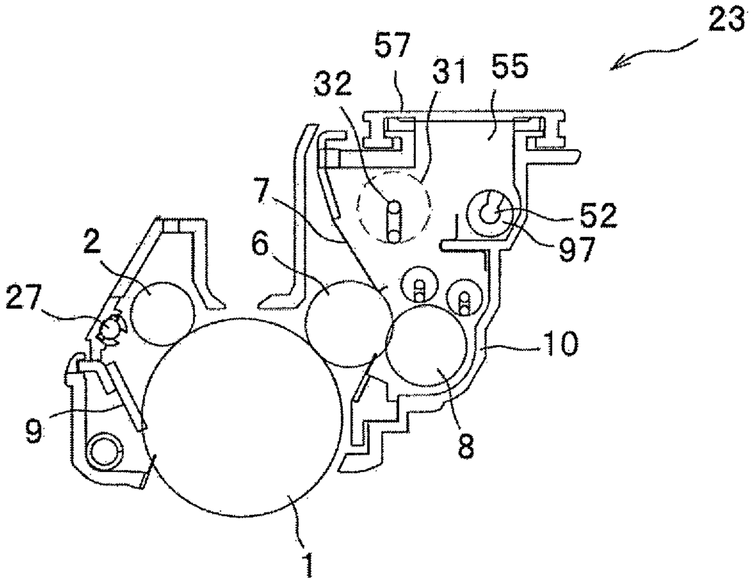
FIG. 3 is a vertically cross-sectional view of a development device according to the first embodiment.
Figure 4:
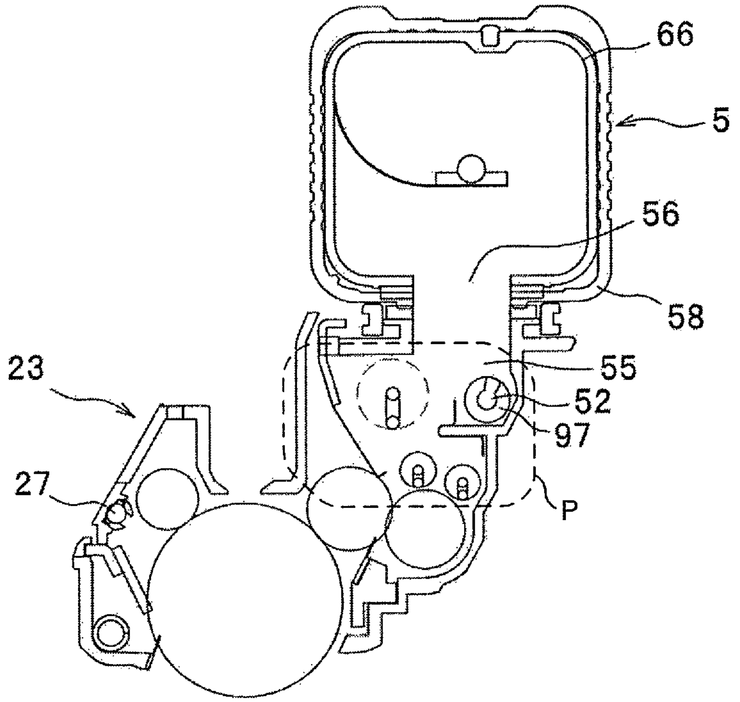
FIG. 4 is a vertically cross-sectional view of the development device (with a toner cartridge installed) according to the first embodiment.

As shown in FIGS. 3 and 4, the development unit 23 as the development device according to the first embodiment includes a first toner supply opening 55 (accommodation opening in claims) in the upper part thereof, the frame 10 as an accommodation part that accommodates the developer (toner), a first shutter member 57 (accommodation opening shutter in claims) that allows the first toner supply opening 55 to open and close, a remaining toner amount detection mechanism 31 as a detection mechanism that detects an amount of toner in the frame 10, and a drive force transmission mechanism 98 (see FIGS. 8A and 8B) that transmits a drive force (rotational force) of a motor 81 (see FIGS. 8A and 8B) as a drive force to the remaining toner amount detection mechanism 31. In FIG. 4, a region indicated by letter P is an accommodation part (region) that accommodates the developer (toner). Further, in the present invention, there is not a particular limitation regarding a capacity of the accommodation part. Therefore, the accommodation part may function as a developer cartridge.

(Frame)

Figure 5A:
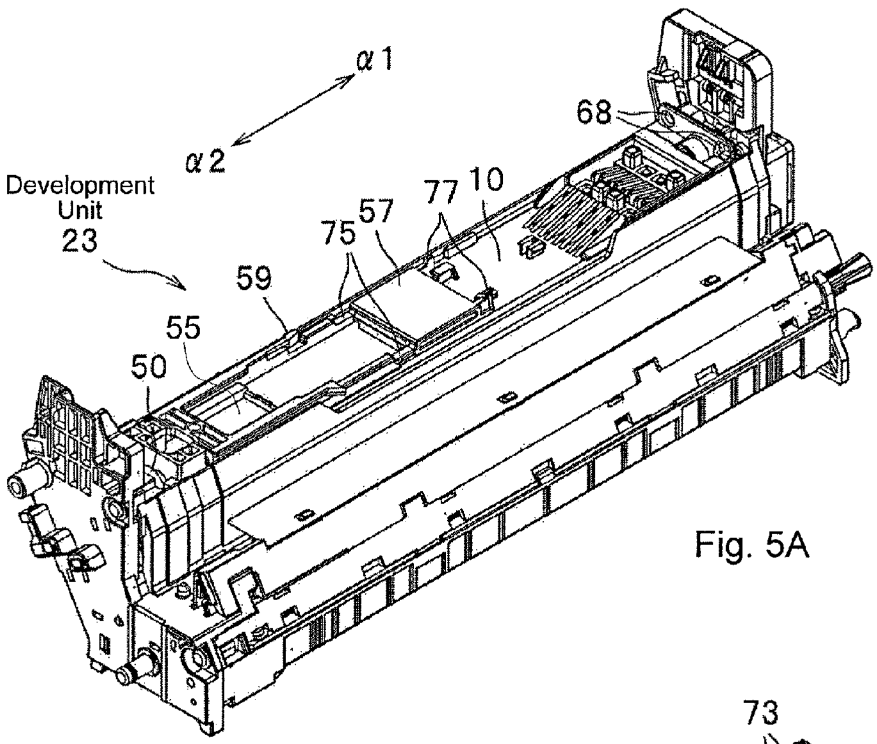
FIGS. 5A and 5B are externally perspective views of the development device according to the first embodiment.
Figure 5B:
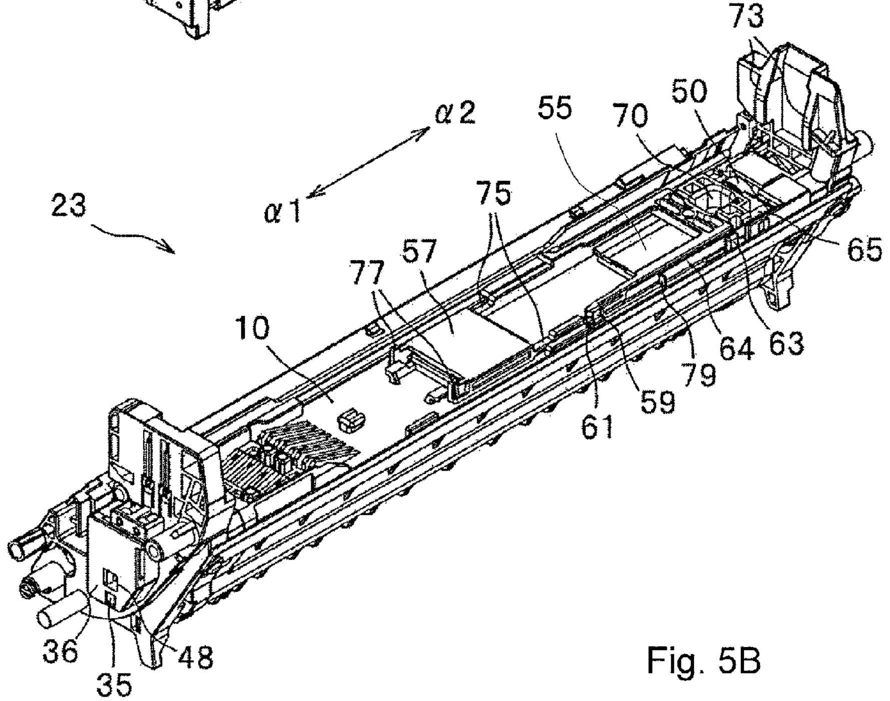

The frame 10 as the accommodation part is formed to configure a certain internal space for accommodating the toner. An overall shape of the frame 10 of the development unit 23 is shown in FIGS. 5A and 5B. The frame 10 includes a first toner supply opening 55 (see FIGS. 3, 5A and 5B) for supplying the toner as the developer, on a surface on which the toner cartridge 5 is installed. The first toner supply opening 55 is a through hole for supplying the toner from the toner cartridge 5 (see FIGS. 6A and 6B) to the development unit 23. The first toner supply opening 55 communicate with a second toner supply opening 56 (supply opening in claims) formed on the toner cartridge 5, as shown in FIG. 4, under a condition where the toner cartridge 5 is installed on the development unit 23 (see FIGS. 7A and 7B). The first toner supply opening 55 and the second toner supply opening 56 may be collectively referred to as a communication part. As the first shutter member 57 of the development unit 23 and a second shutter member 58 (supply opening shutter in claims) provided on the toner cartridge 5 open, the first toner supply opening 55 and the second toner supply opening 56 provide the communication. As a result, the toner is supplemented from the toner cartridge 5 to the development unit 23.

(First Shutter Member)

The first shutter member 57 is formed above a first toner supply opening 55 and is slidable in a longitudinal direction (direction perpendicular to the cross-section in FIGS. 3 and 4; $\alpha 1$-$\alpha 2$ directions in FIGS. 5A and 5B). The first shutter member 57 closes and opens the first toner supply opening 55 by sliding in the longitudinal direction. When it closes, it is in the closed position. When it opens, it is in the opened position. The shutter member takes the above two positions. As shown in FIG. 3, the first shutter member 57 closes the first toner supply opening 55 when the toner cartridge 5 is not installed (see FIGS. 5A and 5B). As shown in FIG. 4, the first shutter member 57 opens the first toner supply opening 55 when the toner cartridge 5 is installed (see FIGS. 7A and 7B).

A first latch member 59 is formed on a side surface of the first shutter member 57. The first latch member 59 locks by engagement with a latch regulation part 61 formed on the frame 10 of the development unit 23 when the first shutter member 57 is closed. As a result, the slide operation of the first shutter member 57 is regulated. Although not shown in the figures, a movement amount regulation part that regulates the movement amount of the first shutter member 57 is provided on the frame 10. The opening and closing operation of the first shutter member 57 is linked to the remaining toner amount detection mechanism 31 (see FIG. 3) via the drive force transmission mechanism 98 (see FIGS. 8A and 8B). The linkage of the first shutter member 57 and the drive transmission to the remaining toner amount detection mechanism 31 is explained with the configuration of the drive force transmission mechanism 98 (see FIGS. 8A and 8B).

(Drive Force Transmission Mechanism)

Figure 8A:
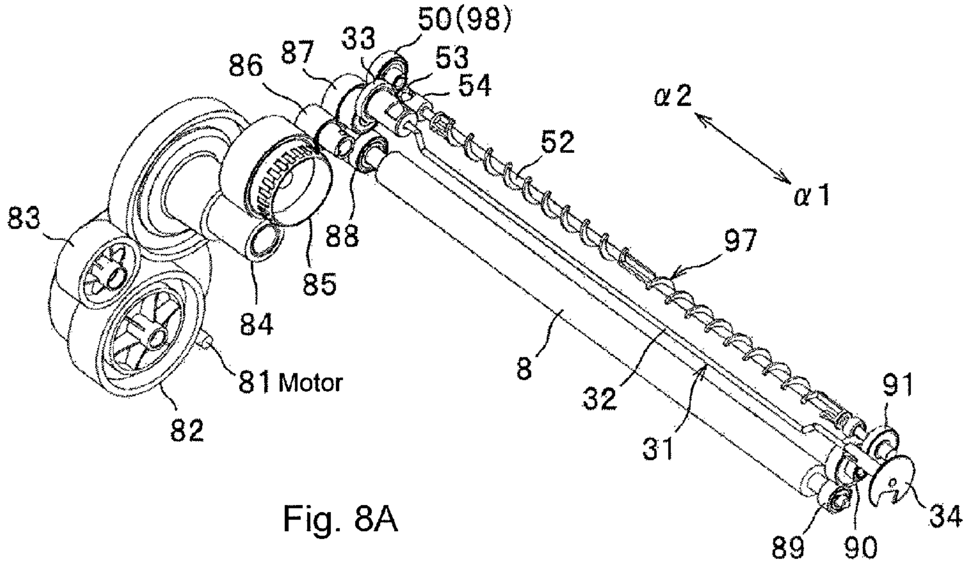
FIGS. 8A and 8B are externally perspective views of a detection mechanism, a drive force transmission mechanism and peripheral devices according to the first embodiment.
Figure 8B:
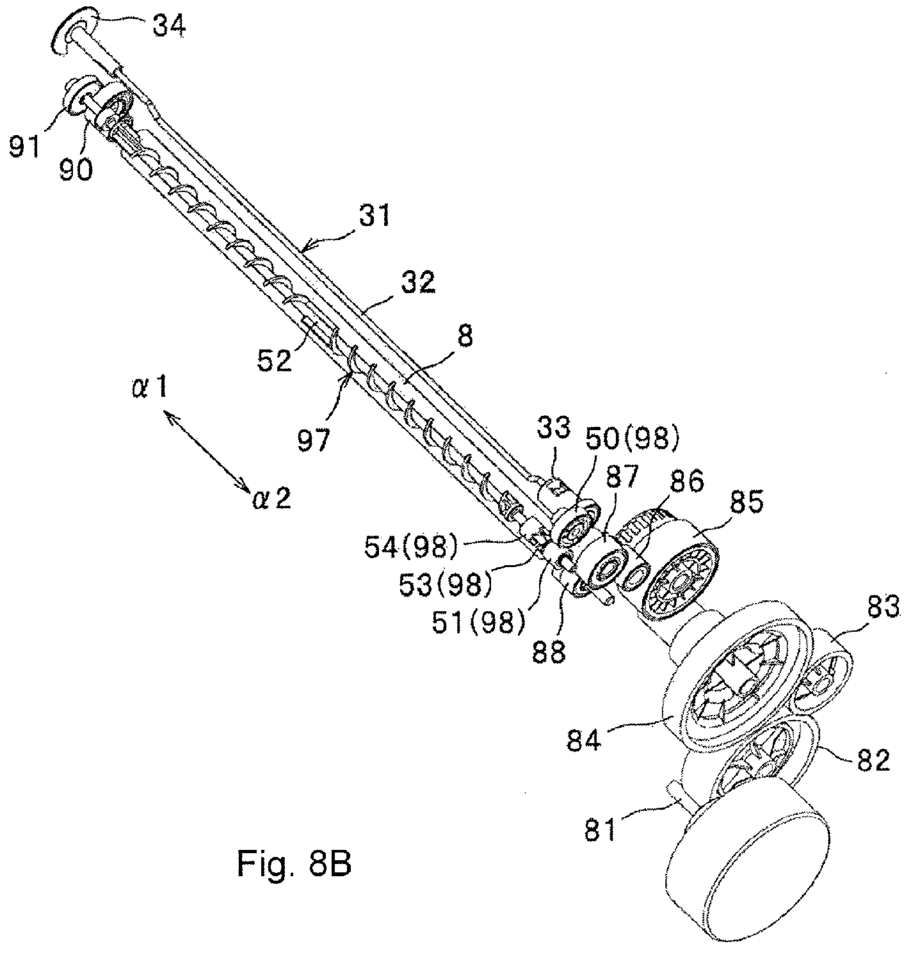

As shown in FIGS. 8A and 8B, the drive force transmission mechanism 98 includes a deceleration gear 50, a coupling gear 51, a first coupling part 53 (first drive force transmission member) formed integrally with the coupling gear 51 and slidable in the $\alpha 1$-$\alpha 2$ direction along a rotational shaft 52 by synchronizing with the coupling gear 51, and a second coupling part 54 (second drive force transmission member) that is formed concentrically with the rotational shaft 52 of a spiral 97 and that engages with the first coupling part 53. The first coupling part 53 positions in a downstream side of a direction of the transmission of the drive force, and the second coupling part 54 positions in an upstream side of the direction of the transmission of the drive force. The first coupling part 53 and the second coupling part 54 may be collectively referred to as an engagement mechanism. When these coupling parts engage each other, it is called an engagement state. When these coupling parts do not engage, it is called a disengagement state. The function of the engagement mechanism is to switch between to transmit or not to transmit the drive force in correspondence with a position of the shutter member. In order to realize the function, not only the gear mating mechanism illustrated, for example, in FIG. 8B but a magnetically engaging mechanism or the like also are available for the present invention.

The deceleration gear 50 meshes with a drive gear 33 and the coupling gear 51. The coupling gear 51 meshes with the deceleration gear 50 and is slidable in the $\alpha 1$-$\alpha 2$ direction on the rotational shaft 52. The rotational shaft 52 is a rotational axis of the coupling gear 51 as the rotational shaft 52 axially supports the coupling gear 51. The first coupling part 53 and the second coupling part 54 configure a jaw clutch with approximately triangular jaw claws.

Figure 8C:
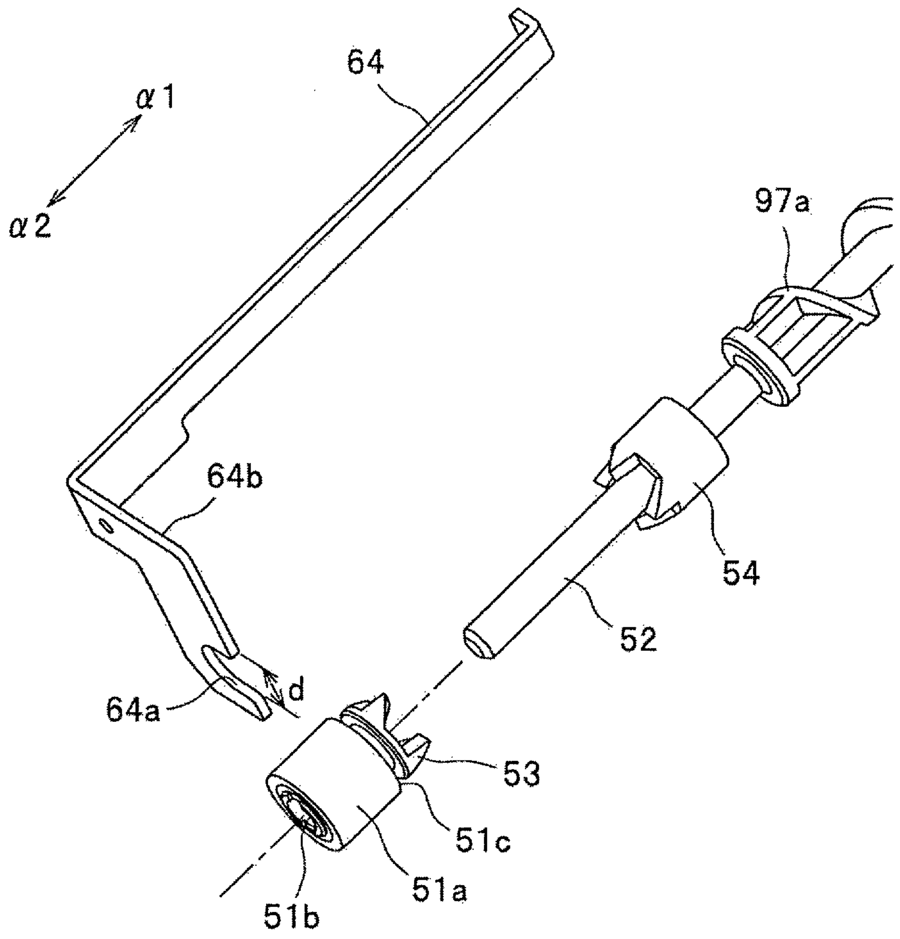
FIG. 8C is an externally perspective view of a spiral, a coupling gear and a link member according to the first embodiment.

A detailed configuration of the spiral 97 and the coupling gear 51 is explained with reference to FIG. 8C. The spiral 97 includes spiral blades 97*a* and the rotational shaft 52 as a developer carrying part, and a second coupling part 54. In addition, the coupling gear 51 is configured from a tooth part 51*a*, a groove part 51*c* formed between the tooth part 51*a* and the first coupling part 53, and an interlock hole 51*b*. The rotational shaft 52 interlocks with the interlock hole 51*b*. In addition, a hook part 64*b* (work part) formed on a link member 64 interlocks with the groove part 51*c*. Here, a width d of the hook part 64*a* formed on the link member 64 is larger than a diameter of the groove part 51*c* but is smaller than a diameter of the first coupling part 53 and the tooth part 51*a*. Therefore, the coupling gear 51 slides and moves in the $\alpha 1$ and $\alpha 2$ directions with respect to the second coupling 54 as the link member 64 moves in the $\alpha 1$ and $\alpha 2$ directions.

In addition, the drive force transmission mechanism 98 is connected to the remaining toner amount detection mechanism 31 that detects the remaining toner amount in the development unit 23, the spiral 97 that includes the rotational shaft 52, a gear 85 that rotates the photosensitive body 1 (see FIG. 3), a gear 86 that rotates the development roller 6 (see FIG. 3), a gear 87, a gear 88 that rotates the toner supply roller 8, a motor 81 provided in the image forming apparatus 100, and gears 82, 83 and 84, so that the drive force is directly or indirectly transmittable.

More specifically, the drive force of the motor 81 as a drive source is first transmitted to the gear 82 from a rotational shaft of the motor 81 and is then transmitted to the gear 83. The drive force is sequentially transmitted to the gear 84, the gear 85, the gear 86, the gear 87, the gear 88, a gear 89, a gear 90, and a gear 91. Then, the drive force is transmitted to the second coupling part 54 formed concentrically with the rotational shaft 52 of the spiral 97.

Next, transmission of the drive force of the motor 81 is determined by whether or not the second coupling part 54 and the first coupling part 53 that is slidable in the $\alpha 1$-$\alpha 2$ direction are in engagement with each other. Whether or not the second coupling part 54 and the first coupling part 53 that is slidable in the $\alpha 1$-$\alpha 2$ direction are in engagement with each other depends on the open/closed state of the first shutter member 57. Details are described later.

When the second coupling part 54 and the first coupling part 53 that is slidable in the $\alpha 1$-$\alpha 2$ direction are in engagement with each other, the drive force of the motor 81 is sequentially transmitted to the first coupling part 53, the coupling gear 51 that synchronizes with the first coupling part 53, the deceleration gear 50, and finally the drive gear 33 of the remaining toner amount detection mechanism 31. As a result, a agitation part 32 and a light blocking plate 34 of the remaining toner amount detection mechanism 31 are rotated by the drive force of the drive gear 33. When the second coupling part 54 and the first coupling part 53 that is slidable in the $\alpha 1$-$\alpha 2$ direction are not in engagement with each other, the drive force of the motor 81 is not transmitted to the coupling gear 51 and subsequent gears.

As described above, the motor 81 provided in the image forming apparatus 100 transmits the drive force via various gears and the drive force transmission mechanism 98 to provide the drive force (rotational force) to the remaining toner amount detection mechanism 31.

The remaining toner amount detection mechanism 31 detects the remaining toner amount in the development unit 23. In addition, the drive transmission to the remaining toner amount detection mechanism 31 links to the operation for the first shutter member 57 to slide in the $\alpha 1$ direction. Details of the remaining toner amount detection mechanism 31 are described later.

Figure 9A:
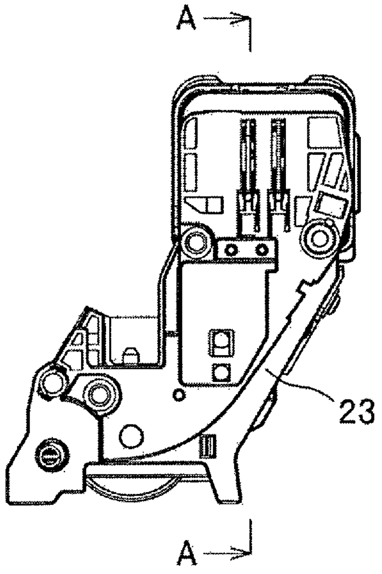
FIG. 9A is a side view.
Figure 9B:
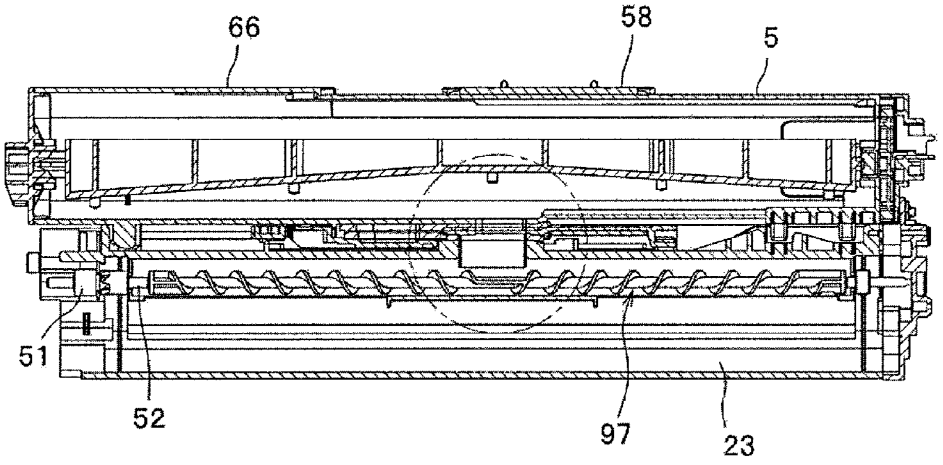
FIG. 9B is a vertically cross-sectional view.
Figure 9C:
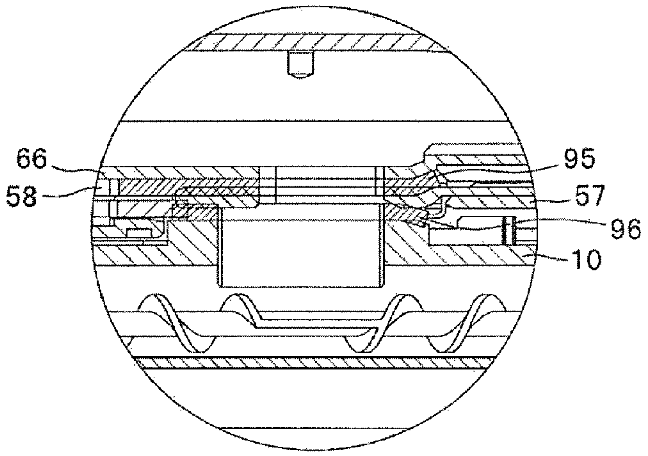
FIG. 9C is an enlarged view of the development device according to the first embodiment.

As shown in FIGS. 9A to 9C, the spiral 97 is a toner carrying member for evenly moving the toner supplied from the second toner supply opening 56 that is positioned in the center of the toner cartridge 5 in the longitudinal direction, to both ends of the development unit 23 in the longitudinal direction. As described above, the spiral 97 rotates about the rotation shaft 52 by the drive force of the motor 81.

Figure 10A:
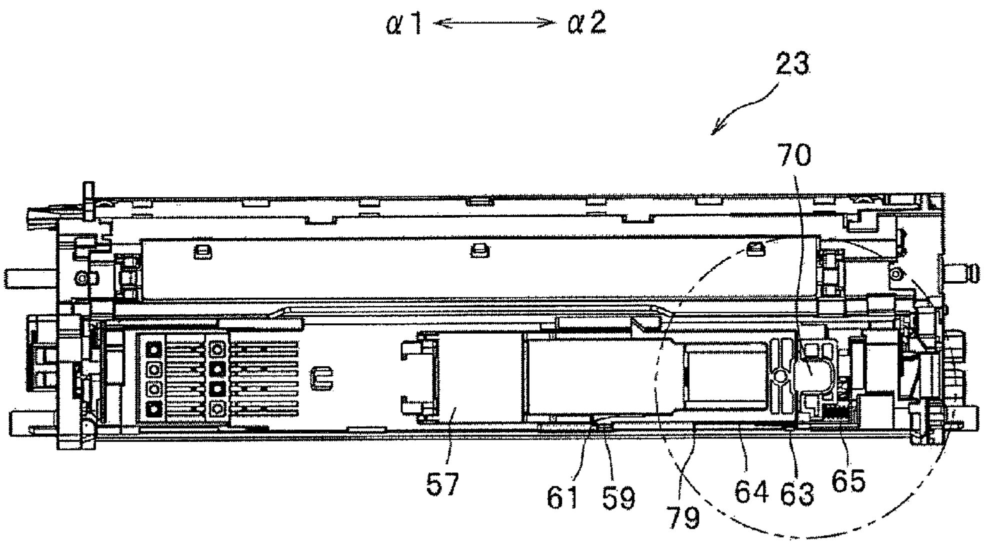
FIG. 10A is a top view and FIG. 10B an enlarged view of the development device according to the first embodiment.
Figure 10B:
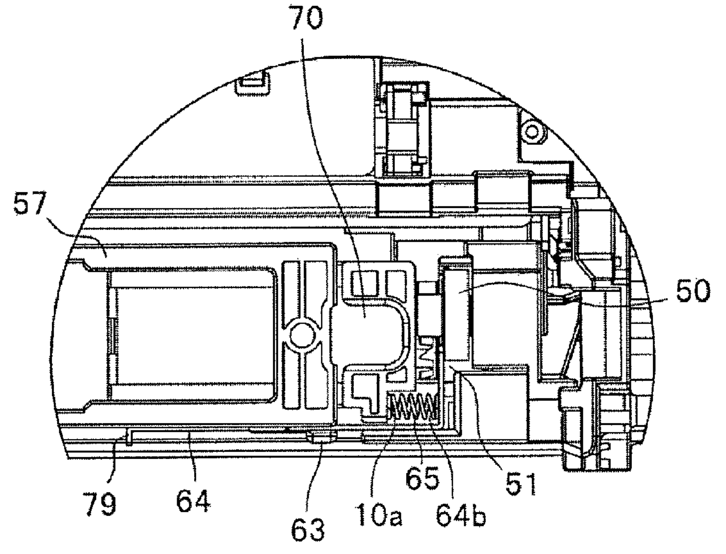
Figure 11:
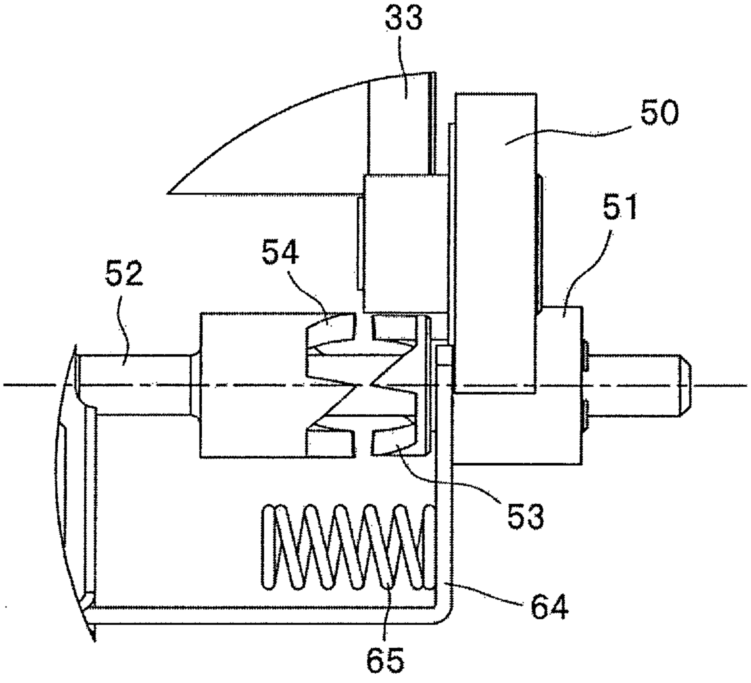
FIG. 11 is a main part enlarged top view of the development device according to the first embodiment.

Next, an interlock mechanism that causes the second coupling part 54 and the first coupling part 53 that is slidable in the $\alpha 1$-$\alpha 2$ direction to engage with each other by linkage with the open/closed state of the first shutter member 57, is described with reference to FIGS. 10 to 15. As shown in FIGS. 10A and 10B, the interlock mechanism is configured from a link holding part 63 as a contact part included in the first shutter member 57, and a link member 64 that is coupled to the coupling gear 51 and that is slidable in the longitudinal direction ($\alpha 1$-$\alpha 2$ direction).

The link holding part 63 is formed on the side surface at a part where the first shutter member 57 extends to an upper part of the drive force transmission mechanism 98. The link holding part 63 contacts a hook part 79 (engagement part) as a contacted part of the line member 64 as the first shutter member 57 slides in the $\alpha 1$ direction. Thereafter, the link holding part 63 pulls the link member 64 in the $\alpha 1$ direction.

The link member 64 is in an approximately L-shape. One end of the link member 64 is coupled to the coupling gear 51, and the other end includes the hook part 79. The link member 64 is attached to the first shutter member 57 that is slidable in the $\alpha 1$ direction. However, the slide in the $\alpha 1$ direction is restricted due to a compression coil spring 65 that generates a bias force in the $\alpha 2$ direction. Therefore, the link member 64 does not slide in the $\alpha 1$ direction unless a bias force greater than a certain level is applied in the $\alpha 1$ direction. One end of the compression spring 65 is held at a holding part 10*a* provided on the frame 10 of the development unit 23, and the other end extends and contracts by striking on a strike part 64*b* formed on the link part 64. As a result, when the link member 64 slides in the $\alpha 1$ direction, the link member 64 is biased in the $\alpha 2$ direction (a direction in which the first coupling part 53 of the coupling gear 51 and the second coupling part 54 formed on the rotation shaft 52 do not engage with each other). The link member 64 and the first shutter member 57 may be collectively referred to as a movement member.

Figure 12:
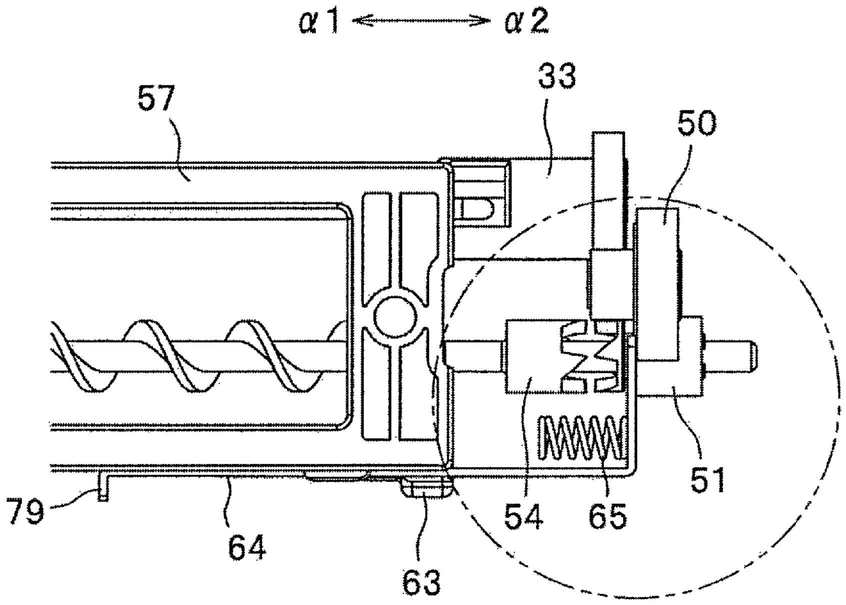
FIG. 12 is a diagram for explaining the drive force transmission mechanism (in a state where the toner supply opening is closed) according to the first embodiment.
Figure 13:
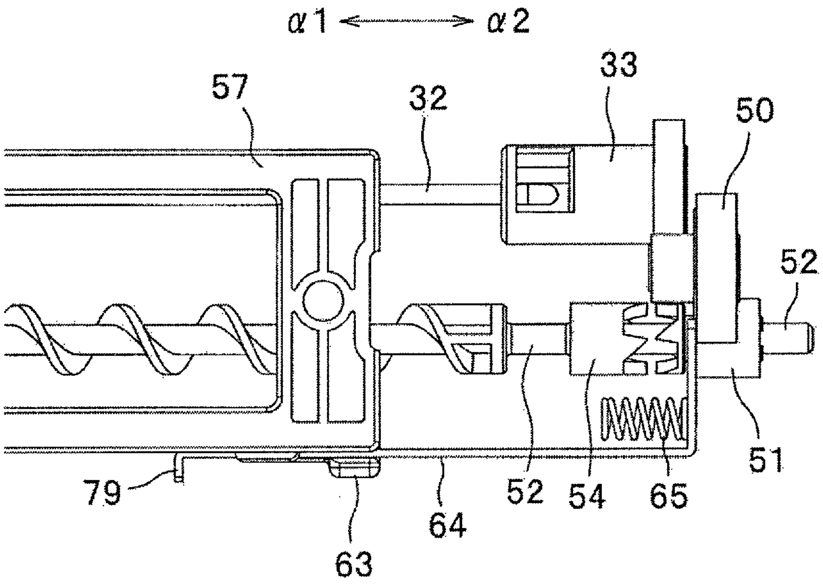
FIG. 13 is a diagram for explaining the drive force transmission mechanism (in a state where coupling parts do not engage with each other—part 1) according to the first embodiment.

When the first shutter member 57 slides in the $\alpha 1$ direction from a state where the first shutter member 57 is closed as shown in FIG. 12, the interlock mechanism turns into a state shown in FIG. 13. In the state shown in FIG. 13, the hook part 79 of the link member 64 is located at a position where the hook part 79 does not hook on the link holding part 63 of the first shutter member 57. At this position, the link member 64 does not slide in the $\alpha 1$ direction because the link member 64 is biased in the $\alpha 2$ direction by the compression coil spring 65. Therefore, the coupling gear 51 that slides by linking with the link member 64 does not slide either. As a result, the first coupling part 53 does not link with the second coupling part 54 formed on the rotational shaft 52, and thus, the drive is not transmitted to the drive gear 33.

Figure 14:
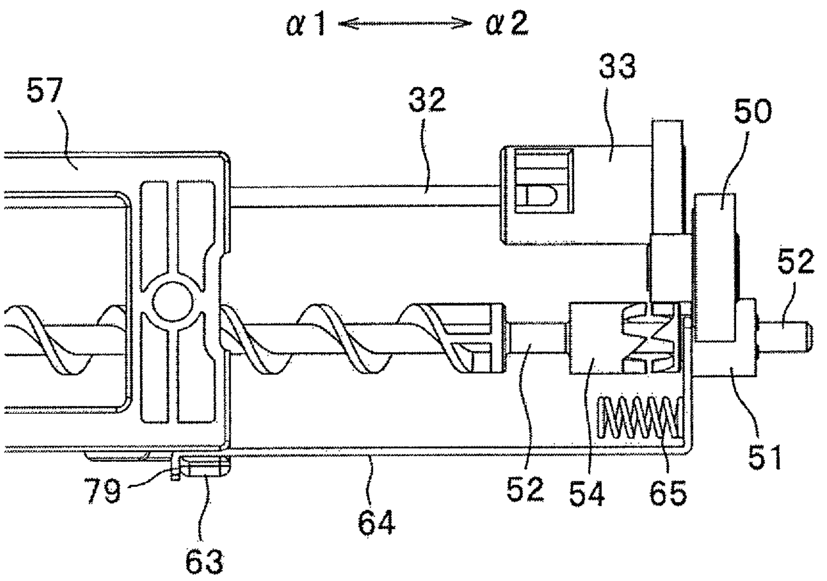
FIG. 14 is a diagram for explaining the drive force transmission mechanism (in a state where the coupling parts do not engage with each other—part 2) according to the first embodiment.

When the first shutter member 57 further slides in the $\alpha 1$ direction from the state shown in FIG. 13, the interlock mechanism turns into a state shown in FIG. 14. In the state shown in FIG. 14, the hook part 79 of the link member 64 is located at a position where the hook part 79 contacts the link holding part 63 of the first shutter member 57. When the first shutter member 57 further slides in the $\alpha 1$ direction from this position contrary to the bias force of the compression coil spring 65, the link member 64 starts sliding in the $\alpha 1$ direction as the hook part 79 of the link member 64 is pulled by the link holding part 63.

Figure 15:
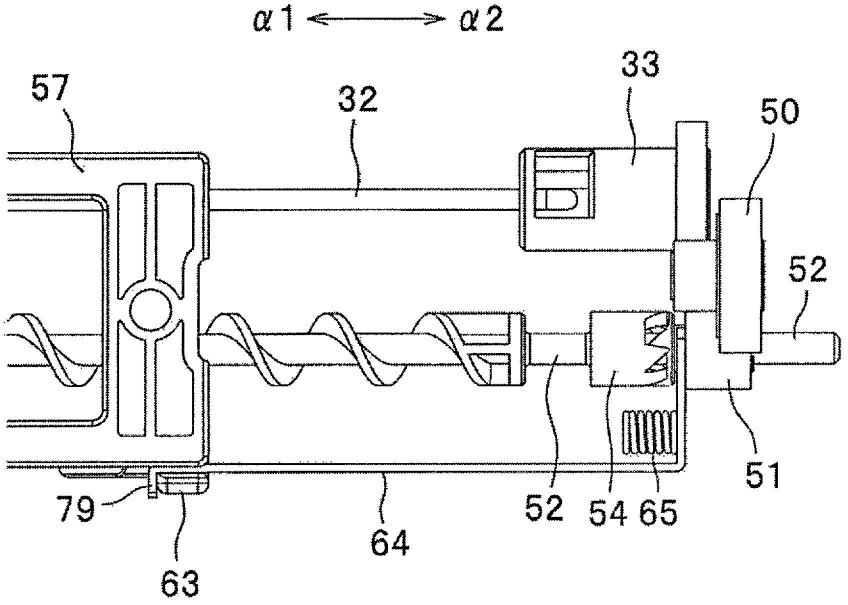
FIG. 15 is a diagram for explaining the drive force transmission mechanism (in a state where the toner supply opening is open) according to the first embodiment.

FIG. 15 illustrates a state where the sliding of the first shutter member 57 in the $\alpha 1$ direction has completed and where the first toner supply opening 55 is opened. In the state shown in FIG. 15, the drive force from the rotational shaft 52 can be transmitted to the coupling gear 51 as the first coupling part 53 of the coupling gear 51 and the second coupling part 54 on the rotational shaft 52 interlocks with each other. When the drive force is transmitted to the coupling gear 51, the drive force is transmitted via deceleration gear 50 to the drive gear 33. As a result, a drive force receiving part 37 (see FIGS. 17A and 17B) of the agitation part 32 is pushed by the drive force transmission part 38 (see FIG. 19A to 19C) in the drive gear 33, and thereby, the agitation part 32 as a rotation body rotates. As the agitation part 32 rotates, the light blocking plate 34 attached to the agitation part 32 also rotates. In the present invention, the rotation body is defined as any part which is configured to move in the the developer accommodation unit. In the embodiment, the rotation body rotates. However, the body might be configured to swing or pivot around an axis. Further, the body might be controlled to make several movements, for example, a rotation, reverse rotation, swing and/or move without specific routes. The function of the rotation body is mainly but not limited to the agitation of the developer stored in the developer accommodation unit. The rotation body may have another function other than the agitation.

The link member 64 starts sliding after the first shutter member 57 slides by a certain distance such that the first coupling part 53 and the second coupling part 54 engage with each other when the first shutter member 57 is at a position where the first shutter member 57 is in the open state in which the toner can be stably supplied. Therefore, when the opening of the first shutter member 57 is not enough, the first coupling part 53 and the second coupling part 54 do not engage with each other. As a result, the drive force is not transmitted to the agitation part 32. Therefore, when the open state of the first shutter member 57 is incomplete (not in a fully open state), the later-discussed controller 99 does not determine that the first shutter member 57 is in the opens state (open). Details are explained at descriptions of the remaining toner amount detection mechanism 31 and the controller 99.

In addition, when a second shutter member 58 of the toner cartridge 5 is closed, the link member 64 is pressed in the $\alpha 2$ direction by the compression coil spring 65. Therefore, the first coupling part 53 of the coupling gear 51 and the second coupling part 54 of the rotational shaft 52 are maintained as being distant from each other.

(Remaining Toner Amount Detection Mechanism)

Configuration of the remaining toner amount detection mechanism 31 is explained with reference to FIGS. 16A to 16C. The remaining toner amount detection mechanism 31 as a detection mechanism includes a crank-shape agitation part 32 as a rotation body, the drive gear 33 that applies a drive force (rotational force) to the agitation part 32, the light blocking plate 34, a light guiding path 35, and a cover 36. The light emitting element 45 and the light receiving element 49 are provided in the image forming apparatus 100 (see FIG. 1). The light blocking plate 34 and the light guiding path 35 may be collectively called a falling position detection part.

Figure 17A:
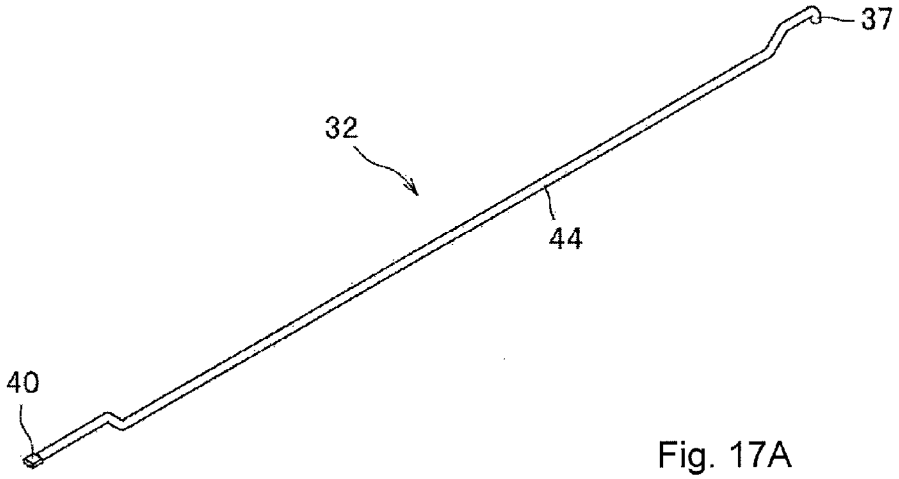
FIGS. 17A and 17B illustrate externally perspective views of a rotation body that configures the detection mechanism according to the first embodiment.
Figure 17B:
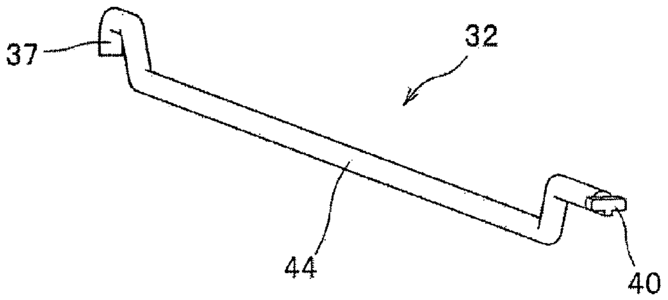

Configuration of the agitation part 32 is explained with reference to FIGS. 17A and 17B. The agitation part 32 as the rotation body is formed in a crank shape. The agitation part 32 is connected to the drive gear 33 (see FIG. 19A to 19C) and includes a drive force receiving part 37 that receives the drive force from the drive gear 33, a crank part 44 that is rotated by the drive force received by the drive force receiving part 37, and a fixing part 40 of which front end is formed in an approximately T-shape and which is connected to the light blocking plate 34. The agitation part 32 agitates the toner in the development unit 23 by rotating inside the development unit 23.

Figure 18A:
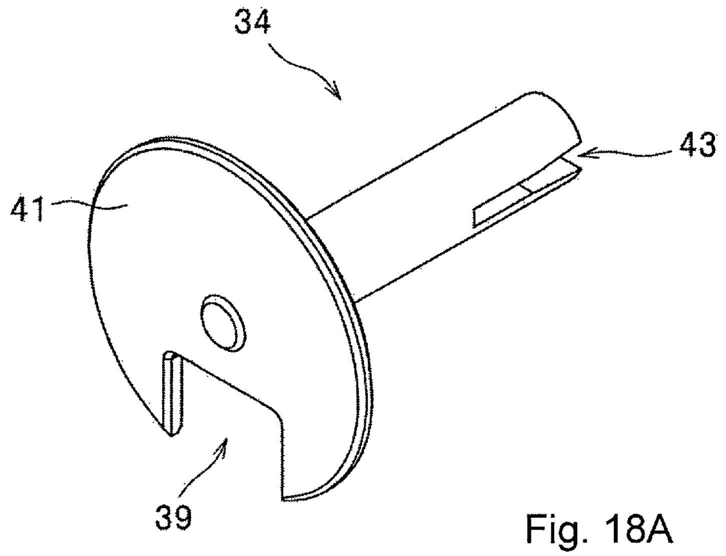
FIGS. 18A to 18C illustrate externally perspective views of a light blocking plate that configures the detection mechanism according to the first embodiment.
Figure 18B:
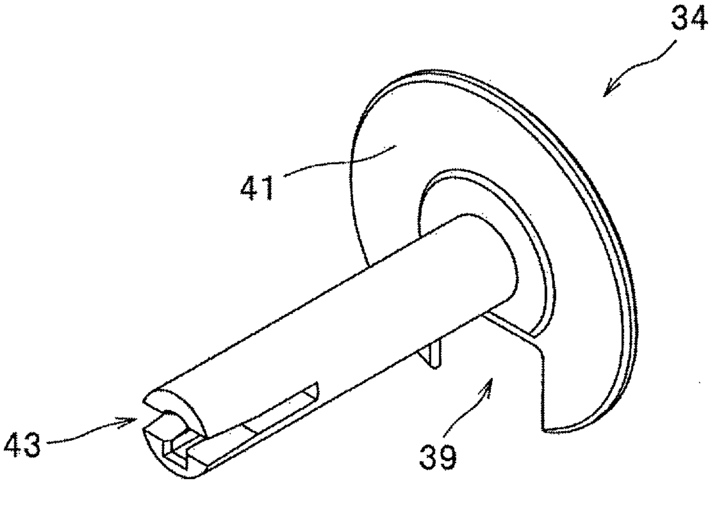
Figure 18C:
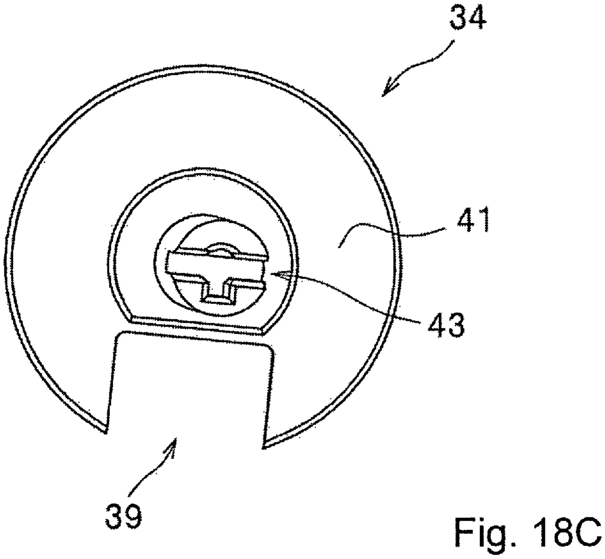

Configuration of the light blocking plate 34 is explained with reference to FIGS. 18A to 18C. The light blocking plate 34 includes a disc-shaped disc part 41, a part of which includes a U-shape part 39 that is a U-shaped cutout (rectangular cutout) as a light passing part, and a T groove part 43 at a tip of an extension part that extends from a center of the disc part 41 in a direction perpendicular to the disc surface. The light blocking plate 34 is made using a material, color and the like that does not transmit the light. The fixing part 40 of the agitation part 32 is attached to the T groove 43. As a result, the light blocking plate 34 rotates together with the agitation part 32.

Here, the light blocking plate 34 is attached to the agitation part 32, such that the U-shape part 39, the crank part 44 of the agitation part 32, and the drive force receiving part 37 are at the same phase. That is, when the U-shape part 39 is positioned at the top of rotation with respect to the rotational center, the crank part 44 and the drive force receiving part 37 also position at the top of rotation with respect to the rotational center.

Configuration of the drive gear 33 is explained with reference to FIG. 19A to 19C. The drive gear 33 includes the drive force transmission part 38 that is formed to contact only one of the side surfaces of the drive force receiving part 37 of the agitation part 32, such that the agitation part 32 can fall by own weight (free-fall) from the top of rotation. The drive force transmission part 38 rotates the inside of the drive gear 33 in the α3 direction using the drive force from the motor and biases the drive force receiving part 37 of the agitation part 32 that is provided inside the drive gear 33 in a separateable manner from the drive force transmission part 38 in the α3 direction.

As a result, the rotational body 32 is biased by, and rotates together with, the drive force transmission part 38 while the crank part 44 is positioned between the surface of the toner 4 to the top of rotation, and free-falls to the surface of the toner 4 at a rotational speed that is faster than the rotational speed of the drive force transmission part 38 due to the weight of the crank part 44, when the crank part 44 passes the top of rotation. On the other hand, the drive force transmission part 38 continues to rotate at the same rotational speed even after the top of rotation, and contacts the drive force receiving part 37 of the agitation part 32 that has free-fallen, at the surface of the toner 4. Then, the drive force transmission part 38 rotates together with the agitation part 32 again to the top of rotation. The U-shape part 39 of the light blocking plate 34 rotates in the same manner as the drive force receiving part 37 and the crank part 44 because the U-shape part 39 of the light blocking plate 34 is attached so as to be in the same phase as that of the drive force receiving part 37 and the crank part 44.

Figure 20:
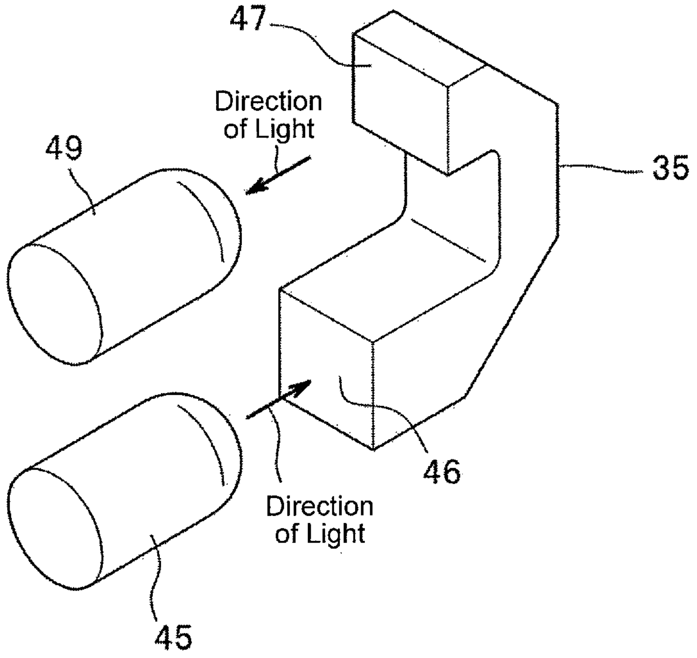
FIG. 20 is an externally perspective view of a light emitting element and a light receiving element that configure the detection mechanism according to the first embodiment.

Configuration of the light guiding path 35 is explained with reference to FIG. 20. The light guiding path 35 is made of a transparent material, such as polymenthyl methacrylate (PMMA) and the like. The light guiding path 35 is configured from an entrance part 46 that receives the light through a hole part 48 of the cover 36 (see FIGS. 16A to 16C) from the light emitting element 45 provided in the image forming apparatus 100, and an exit part 47 that allows the light, of which direction has been changed, to be exited to the light receiving element 49 provided in the image forming apparatus 100 through the hole part 48 of the cover 36, after changing the direction of the light received from the entrance part 46.

The light is transmitted to the light receiving element 49 only when the U-shape part 39 of the light blocking plate 34 is between the exit part 47 and the light receiving element 49. The light transmitted to the light receiving element 49 from the exit part 47 is blocked by the disc part 41 when the U-shape part 39 at other positions. Therefore, the light receiving element 49 reacts by repeating the guiding (passing or transmitting) or blocking of the light by the light blocking plate 34 that is linked to the operation of the agitation part 32 and outputs to the controller 99 a light reception signal that indicates that the light is being transmitted.

Figure 21A:
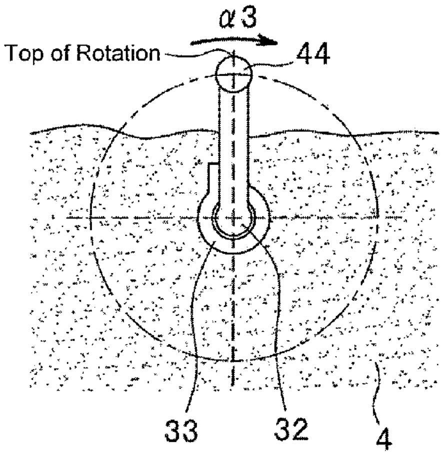
FIGS. 21A and 21B are diagrams for explaining a remaining toner amount detection operation (when there is enough toner) by the detection mechanism according to the first embodiment.
Figure 21B:
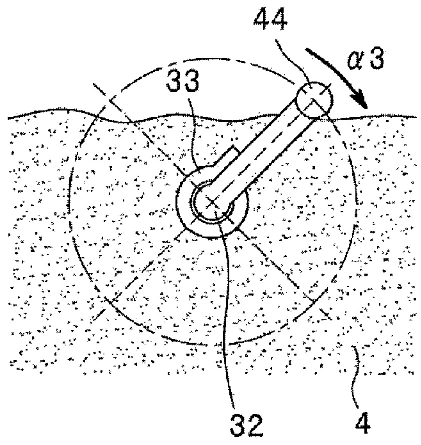
Figure 22A:
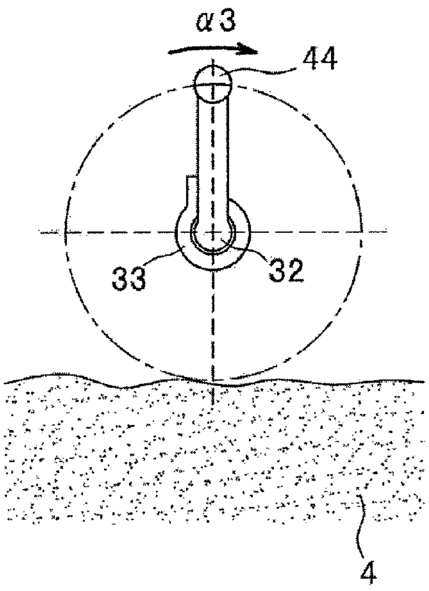
FIGS. 22A and 22B are diagrams for explaining a remaining toner amount detection operation (when the toner is low) by the detection mechanism according to the first embodiment.
Figure 22B:
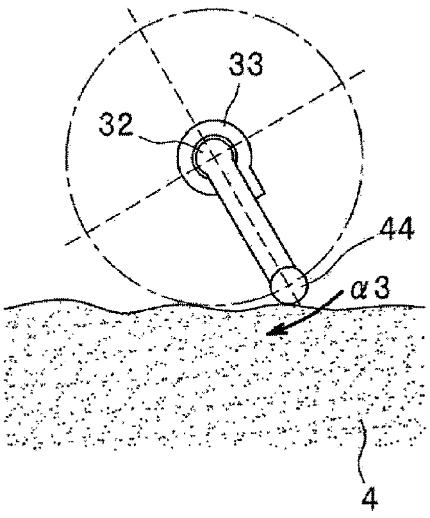

FIGS. 21A and 21B are diagrams for explaining an operation of the agitation part 32 when there is enough toner in the development unit 23. FIGS. 22A and 22B are diagrams for explaining the operation of the agitation part 32 when the amount of toner is low in the development unit 23.

As shown in FIGS. 21A and 21B, when the inside of the development unit 23 is sufficiently filled by the toner 4, the free fall operation of the agitation part 32 is stopped at a position of the surface of the toner 4 near the top of rotation even when the agitation part 32 is pushed from the top of rotation of the agitation part 32 by the drive force transmission part 38 of the drive gear 33. In contrast, as shown in FIGS. 22A and 22B, when the toner 4 inside the development unit 23 is low, the free fall operation of the agitation part 32 is stopped by the surface of toner 4 at a position far from the top of rotation, compared to the case where the inside of the development unit 23 is filled with the toner 4. As a result, when the toner 4 inside the development unit 23 is low, the free fall time of the agitation part 32 is longer than the case where the inside of the development unit 23 is sufficiently filled with the toner 4.

Because the crank part of the agitation part 32 and the U-shape part 39 of the light blocking plate 34 are in the same phase, the U-shape part 39 of the light blocking plate 34 is at the lower part when the agitation part 32 free-falls and when the crank part 44 is at the lower part. Therefore, as shown in the time chart in FIG. 23, for example, the light guiding time for the light blocking plate 34 to guide (transmit) the light from the exit part 47 of the light guiding path 35 becomes long when the toner 4 in the development unit 23 is low. On the other hand, the light guiding time for the light blocking plate 34 to guide (transmit) the light from the exit part 47 of the light guiding path 35 becomes short when the inside of the development unit 23 is sufficiently filled with the toner 4.

As such, the rotation operation of the agitation part 32 changes, and accordingly, the time for the U-shape part 39 of the light blocking plate 34 to transmit the light varies, depending on the amount of the toner 4 in the development unit 23. At the same time, the time for the disc part 41 to block the light varies. Therefore, the remaining toner amount detection mechanism 31 can determine the toner amount of the development unit 23 based on a difference between the light guide time and the light blocking time detected by the light receiving element 49.

<Controller>

The controller 99 shown in FIG. 1 is configured from large scale integration (LSI) circuits including a central processing unit (CPU). The controller 99 uses a light receiving signal that indicates that the light received from the light receiving element 49 has been transmitted, to determine the remaining amount of toner 4 and whether or not the first shutter 57 is open. In addition, the controller 99 controls the entire image forming apparatus 100.

(Determination of Remaining Toner Amount)

The controller 99 determines the remaining toner amount by using the light receiving signal that indicates that the light received from the light receiving element 49 has been transmitted. For example, the controller 99 determines that there is enough remaining amount of toner when a duty ratio (t2/T shown in FIG. 23A) of the light receiving signal received from the light receiving element 49 during the rotation period T of the agitation part 32 is equal to or less than a certain level, and that the remaining amount of toner is low when the duty ratio (t2/T shown in FIG. 23B) of the light receiving signal received from the light receiving element 49 during the rotation period T of the agitation part 32 is equal to or greater than the certain level.

(Determination as to Whether or Not First Shutter Member 57 is Open)

The controller 99 determines whether or not the first shutter member 57 is open, by using the light receiving signal that indicates that the light received from the light receiving element 49 has been transmitted. For example, when the light receiving signal does not change, such as when the light receiving signal is continuously received during the rotation period T of the agitation part 32 (t2/T=1 shown in FIG. 24A) or when the light receiving signal is not continuously received during the rotation period T of the agitation part 32 (t2/T=0 shown in FIG. 24B), the controller 99 determines that the first shutter member 57 is not open.

<Toner Cartridge>

Figure 6A:
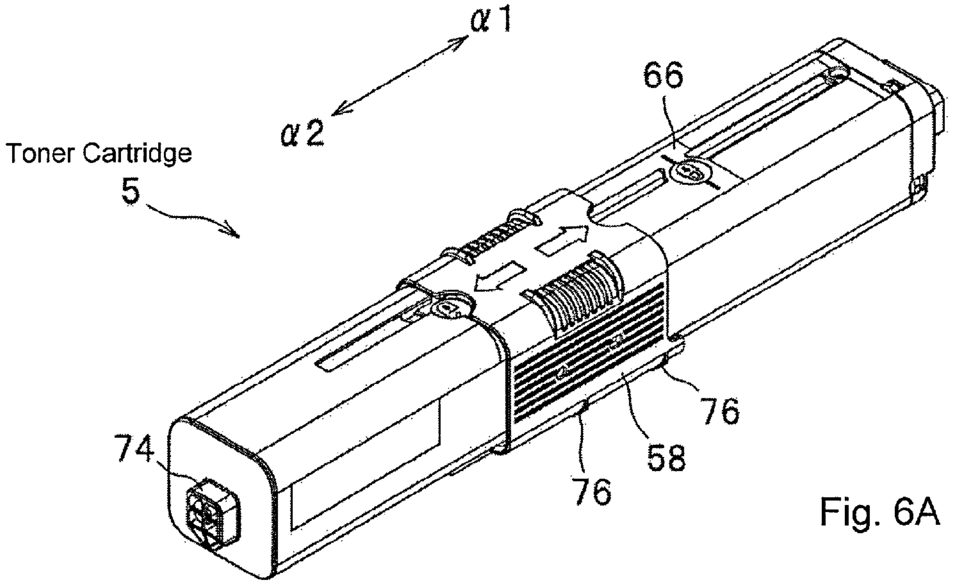
FIGS. 6A and 6B are externally perspective views of the toner cartridge according to the first embodiment.
Figure 6B:
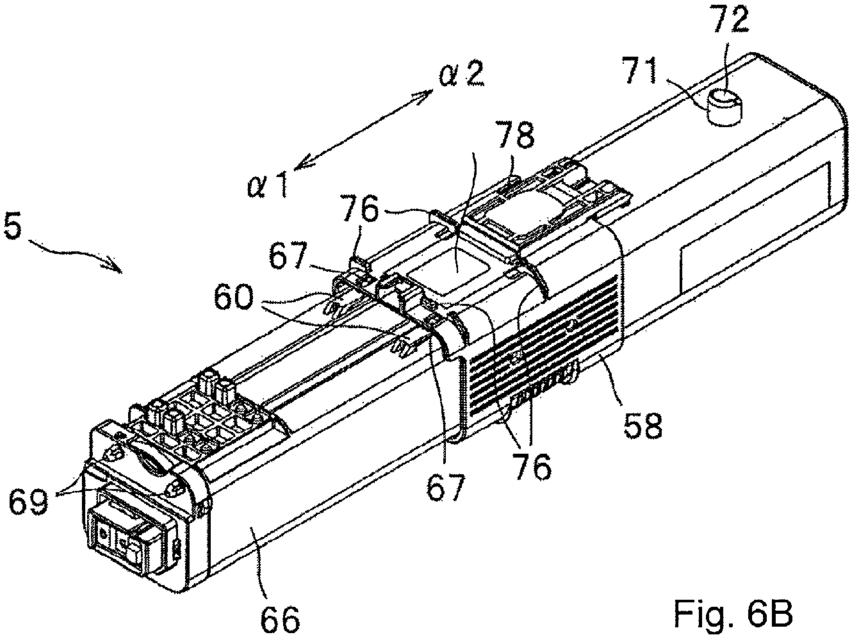
Figure 7A:
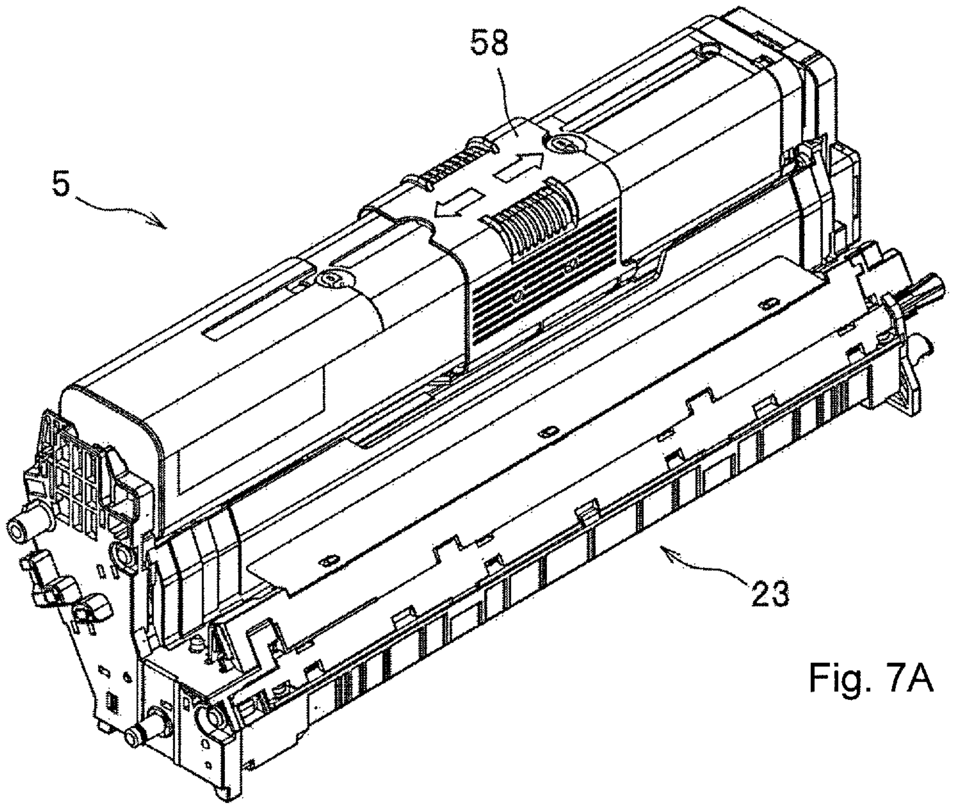
FIGS. 7A and 7B are externally perspective views of the development device (with a toner cartridge installed) according to the first embodiment.
Figure 7B:
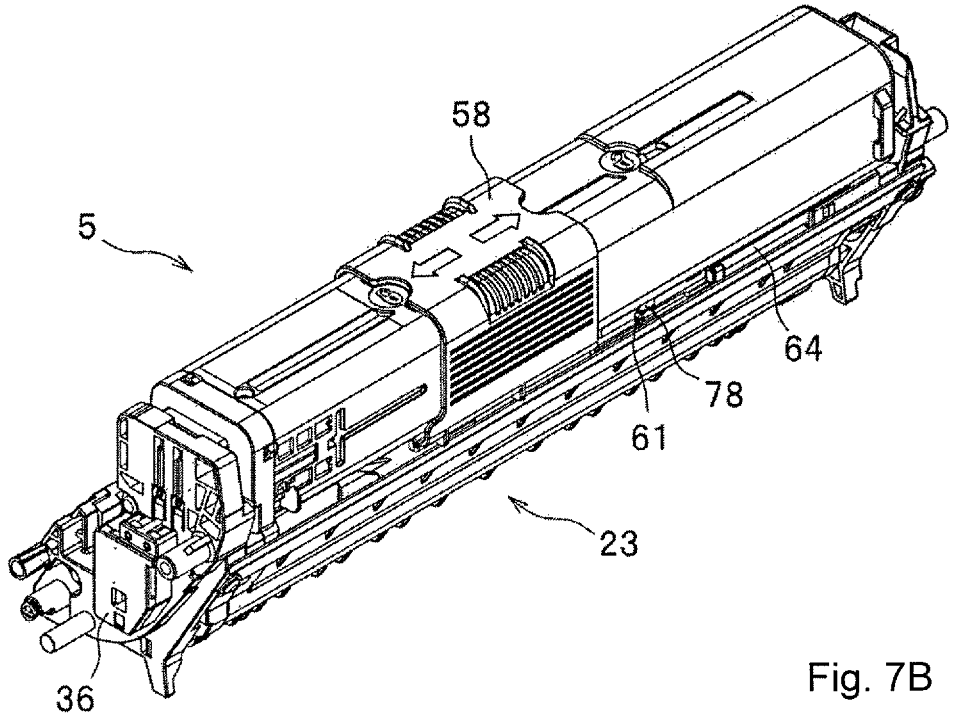

Configuration of the toner cartridge 5 as a supplement container is explained with reference to FIGS. 6A and 6B. First posts 69 that fit in attachment holes 68 (see FIGS. 5A and 5B) of the development unit 23 are provided on the side surface of the toner cartridge 5. In addition, a second post 71 that fits in a U-shape groove 70 (see FIG. 5B) of the development unit 23 is provided on the bottom surface of the toner cartridge 5. A C surface 72 of the second post 71 is provided on the side opposite from the first posts 69. Moreover, a guide part 74 that fits in installation/removal guide ribs 73 (see FIG. 5B) of the development unit 23 is provided on the side surface of the toner cartridge 5.

The second shutter member 58 that surrounds a circumference part 66, that covers the second toner supply opening 56 (see FIG. 4) as a supplement opening provided on the circumference part 66 for supplementing the toner as the developer, and that is provided slidable in the longitudinal direction ($\alpha$1-$\alpha$2 direction), is provided on the toner cartridge 5. Latch regulation holes 67 are provided on the bottom surface of the second shutter member 58. When the second shutter member 58 is opened and closed, the second shutter member 58 is locked by fitting second latch members 60 provided on the circumference part 66 to the latch regulation holes 67.

Figure 25A:
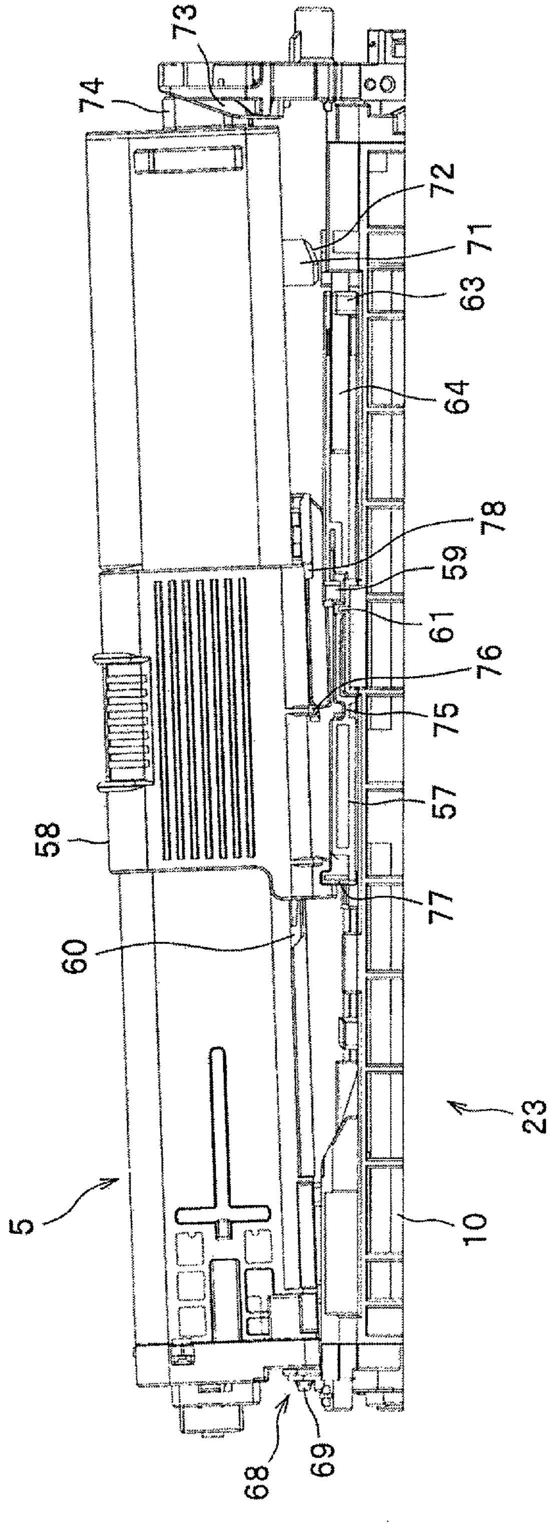
FIG. 25A illustrates a situation where the toner cartridge is installed on the development device according to the first embodiment.
Figure 25B:
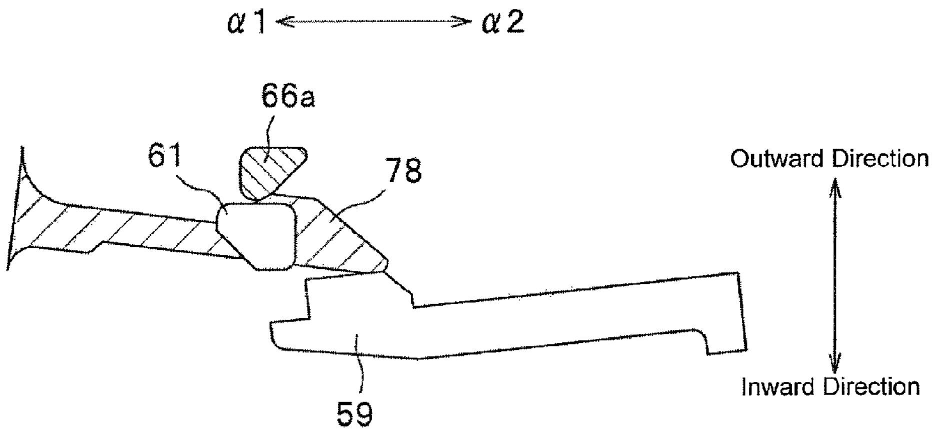
FIG. 25B illustrates a situation where a first latch member formed on the development device according to the first embodiment is released from a latch regulation part.

Furthermore, a second protrusion part 78 is provided on the bottom surface of the second shutter member 58. The second protrusion part 78 elastically deforms in the inward direction and depresses the first latch member 59 of the development unit 23 in the outward direction by contacting a guide part 66*a* (see FIG. 25B) provided on the circumference part 66 when the second shutter member 58 slides in the opening direction, that is, the $\alpha$1 direction (see FIG. 25B). As a result, engagement of the first latch member 59 with the latch regulation part 61 (see FIG. 25A) is released. FIG. 25A illustrates a situation where the toner cartridge is installed on the development unit 23. FIG. 25B illustrates a situation where the first latch member 59 is released from the latch regulation part 61.

As shown in FIG. 9A to 9C, a seal member 95 as an elastic member is adhered by a double-sided tape to the circumference part 66 of the toner cartridge 5. The seal member 95 increases airtightness between the circumference part 66 and the second shutter member 58 by contacting the circumference 66 and the second shutter member 58 and prevents the toner from leaking from a gap between the circumference part 66 and the second shutter member 58. In the present embodiment, the seal member 95 as the elastic member is formed of a urethane foam.

<Other Structures Included in Development Device>

Other structures included in the development unit 23 as the development device are explained with reference to FIGS. 5A and 5B. The attachment holes 68, in which the first posts 69 provided on the side surface of the toner cartridge 5 (see FIGS. 6A and 6B) fit, are provided on the frame 10 of the development unit 23. In addition, the U-shape groove part 70, in which the second post 71 provided on the bottom surface of the toner cartridge 5 fits, is provided on the frame 10 of the development unit 23. Moreover, the installation/removal guide ribs 73 for the toner cartridge 5, in which the guide part 74 provided on the side surface of the toner cartridge 5 fits, is provided on the frame 10 of the development unit 23.

Further, first protrusion parts 77 that depress the second latch members 60 provided on the bottom surface of the toner cartridge 5 are provided on the first shutter member 57 of the development unit 23. Furthermore, the first latch member 59 that is depressed by the second protrusion part 78 provided on the bottom surface of the toner cartridge 5 is provided on the first shutter member 57 of the development unit 23. When the toner cartridge 5 is installed on the development unit 23, the first protrusion parts 77 provided on the first shutter member 57 of the development unit 23 depresses the second latch members 60 of the toner cartridge 5 (see FIG. 25A). As a result, the second latch members 60 are released from the latch regulation holes 67 (see FIGS. 6A and 6B) of the second shutter member 58 of the toner cartridge 5. Therefore, the second shutter member 58 becomes slidable.

In addition, the second protrusion part 78 provided on the toner cartridge 5 elastically deforms in the inward direction to a position at which the first latch member 59 releases engagement with the latch regulation part 61, by depressing the first latch member 59 of the development unit 23 (see FIG. 25B). Therefore, the first shutter member 57 becomes slidable. Groove parts 75, in which ribs 76 provided on the second shutter member 58 of the toner cartridge 5 are fit when the toner cartridge 5 is installed, are provided on the first shutter member 57 of the development unit 23. Therefore, the first shutter member 57 and the second shutter member 58 do not slide individually but always slide together.

As shown in FIG. 9A to 9C, a seal member 96 as an elastic member is adhered by a double-sided tape to the frame 10 of the development unit 23. The seal member 96 increases airtightness between the development unit 23 and the second shutter member 58 by contacting the frame 10 of the development unit 23 and the second shutter member 58 and prevents the toner from leaking from a gap between the development unit 23 and the second shutter member 58. In the present embodiment, the seal member 96 as the elastic member is formed of a urethane foam. This completes the explanation of the configuration of the image forming apparatus according to the first embodiment.

Operation of Image Forming Apparatus According to First Embodiment

Operation of the image forming apparatus according to the first embodiment is explained below with reference to the drawings used in the explanation of configurations as needed.

(Image Formation Operation)

An image formation operation performed by the image forming apparatus 100 is explained with reference to FIGS. 1 and 2. A recording medium 13 supplied from the sheet supply cassette 20 passes through the sheet carrying path 15 via medium carrying rollers 16-19. The detection part 26 located in the middle of the sheet carrying path 15 detects a thickness of the medium 13. Moreover, on the transfer belt unit 24 located in the middle of the sheet carrying path 15, the image formed by the development unit 23 is transferred onto the recording medium 13 by the transfer roller 12. The image is fixed on the recording medium 13 by the fuser 25 thereafter, and is carried to the stacker 21.

Next, operation inside the development unit 23 during the image formation operation is explained. The toner 4 supplied from the toner cartridge 5 is supplied to the development roller 6 by the toner supply roller 7. The toner 4 supplied to the development roller 6 is restricted to a certain thickness by the development blade 8. The toner 4 is developed on the electrostatic latent image formed by the LED head 3 on the photosensitive body 1.

The developed toner 4 is electrostatically transferred to the recording medium 13 by the development roller 12. The toner 4 that was not transferred onto the recording medium 13 and remained on the surface of the photosensitive body 1 is scraped by the cleaning blade. The scraped toner 4 is carried to a waste toner collection part 29 by a waste toner carrying spiral (not shown). To make the electric difference between sections on the surface of the cleaned photosensitive body 1 used by the electrostatic latent image and other sections on the surface of the cleaned photosensitive body 1 even, charges on the entire surface of the photosensitive body 1 are removed by the light from the charge removal part 27, and the charging member 2 electrically charges the photosensitive body 1. This completes explanation of the image formation operation performed by the image forming apparatus 100.

(Installation and Removal Operation for Toner Cartridge)

Installation and removal operations for the toner cartridge 5 are explained with reference to FIG. 25A. The toner cartridge 5 is installed, while being tilted, on the development unit 23 by fitting the first posts 69 provided on the toner cartridge 5 into the attachment holes 68 provided on the side surface of the development unit 23 and by guiding the guide part 74 of the toner cartridge 5 into the guide ribs 73 provided on the opposite side surface of the development unit 23. Then, the second post 71 provided on the toner cartridge 5 is inserted into the U-shape groove part 70 provided on the frame 10 of the development unit 23 (see FIGS. 5A and 5B). Here, the toner cartridge 5 is installed and removed while being tilted. With the C surface 72 of the second post 71, interference with an entrance opening of the U-shape groove part 70 is avoided, allowing smooth installation and removal.

On the other hand, the ribs 76 (see FIGS. 6A and 6B) of the second shutter member 58 provided on the toner cartridge 5 fit in the groove part 75 (see 25A) provided on the first shutter member 57 of the development unit 23. In that state, when the second shutter member 58 of the toner cartridge 5 is slid, the second protrusion part 78 contacts the first latch member 59 by elastically deforming in the direction of the first latch member 59 (inward direction) by the guide part 66*a*, as shown in FIG. 25B. Further, the first latch member 59 of the second protrusion part 78 elastically deforms in the inward direction and to a position at which the engagement of the first latch member 59 and the latch regulation part 61 is released. As a result, the first shutter member 57 is released from the latch regulation part 61.

Moreover, at the same time as the above-described operation, the first protrusion parts 77 provided on the first shutter member 57 of the development unit 23 depresses the second latch parts 60 of the toner cartridge 5. As a result, the second latch members 60 are released from the latch regulation holes 67 (see FIGS. 6A and 6B) of the second shutter member 58 of the toner cartridge 5. As a result of these operations, the first shutter member 57 of the development unit 23 and the second shutter member 58 of the toner cartridge 5 slide together, and the first toner supply opening 55 (see FIG. 4) provided on the development unit 23 and the second toner supply opening 56 (see FIG. 4) provided on the toner cartridge 5 overlap with each other and open.

Movement of the first shutter member 57 is regulated by the movement amount regulation part (not shown) at a position at which the first shutter member 57 has slid by a certain distance. In accordance with the regulation, the movement of the second shutter member 58 of the toner cartridge 5 also stops. At the position at which the movement of the first shutter member 57 and the second shutter member 58 is regulated, both the first toner supply opening 55 (see FIG. 4) provided on the development unit 23 and the second toner supply opening 56 (see FIG. 4) provided on the toner cartridge 5 are in a fully open state. The first shutter member 57 and the second shutter member 58 are maintained at the position of the fully open state at which the movement is regulated. This is based on the following reasons.

A frictional force is generated as the second shutter member 58 contacts the seal member 95 and seal member 96, as shown in FIG. 9A to 9C. Therefore, an external force of approximately 500 gf (gram-force) to operate the second shutter member 58. On the other hand, a bias force of approximately 50 gf applies in the direction to close the second shutter member 58 via the first shutter member 57, due to the compression coil spring 65 when the second shutter member 58 is in the open state as shown in FIG. 15. In other words, the external force of approximately 500 gf is needed to operate the second shutter member 58, whereas the bias force by the compression coil spring 65 is approximately 50 gf, which is significantly smaller than the external force. Therefore, the fully open state shown in FIG. 15 is maintained for the first shutter member 57 and the second shutter member 58.

The operation to remove the toner cartridge 5 from the development unit 23 is performed by a reverse order of the above-described toner cartridge installation operation. This completes the explanation of the installation/removal operation of the toner cartridge 5.

(Operation to Transmit Drive Force to Detection Mechanism)

The drive force transmission operation to transmit the drive force to the remaining toner amount detection mechanism 31 as the detection mechanism, with reference to FIGS. 14, 15 and 16. The first shutter member 57 of the development unit 23 slides in the α1 direction as shown in FIG. 14 as the toner cartridge 5 is installed. Then, the link holding part 63 of the first shutter member 57 contacts the hook part 79 of the link member 64, and the link member 64 also slides in the α1 direction.

As shown in FIG. 15, when the link member 64 slides in the α1 direction, the coupling gear 51 coupled to the link member 64 also slides in the α1 direction on the rotational shaft 52. Therefore, the first coupling part 53 of the coupling gear 51 and the second coupling part 54 of the rotational shaft 52 fit with each other. As a result, the drive force from the rotational shaft 52 can be transmitted to the coupling gear 51.

Figure 19A:
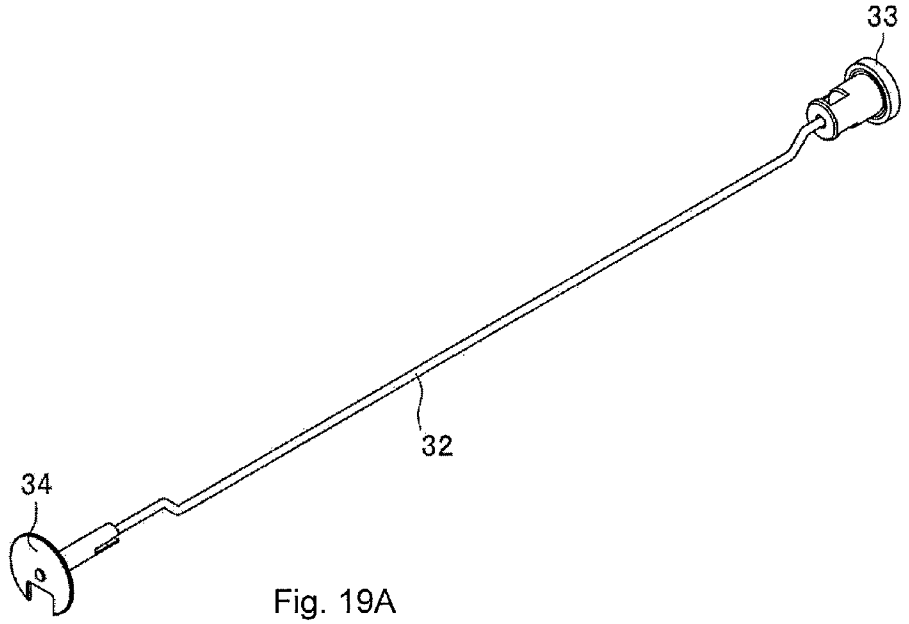
FIGS. 19A and 19B are externally perspective views of a drive gear that configures the detection mechanism according to the first embodiment.
Figure 19B:
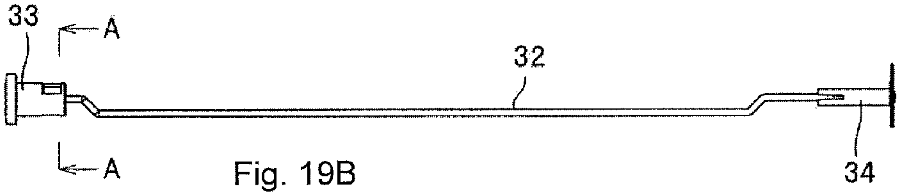
Figure 19C:
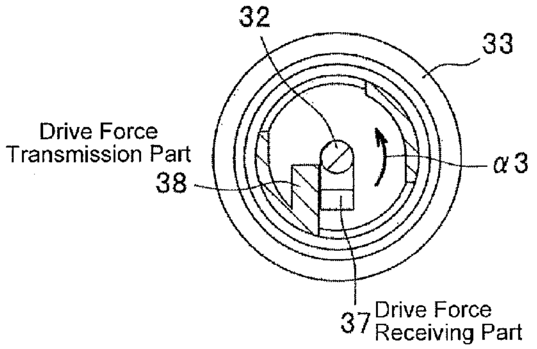
FIG. 19C is a cross-sectional view along A-A line shown in FIG. 19B.

If the drive force is transmitted to the coupling gear 51 in a state where the drive force from the rotational shaft 52 can be transmitted to the coupling gear 51, the drive force is transmitted to the drive gear 33 via the deceleration gear 50, and the agitation part 32 (see FIGS. 8A and 8B) is rotated as the drive force receiving part 37 (see FIGS. 17A and 17B) of the agitation part 32 is pushed by the drive force transmission part 38 (see FIG. 19A to 19C). As the agitation part 32 rotates, the light blocking plate 34 (see FIGS. 8A and 8B) attached to the agitation part 32 also rotates.

Figure 16A:
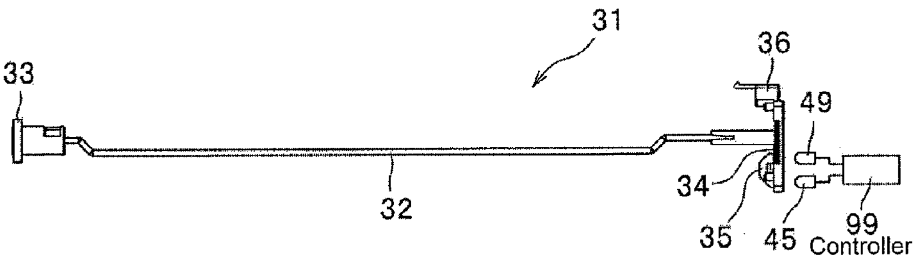
FIGS. 16A to 16C illustrate externally perspective views of a detection mechanism according to the first embodiment.
Figure 16B:
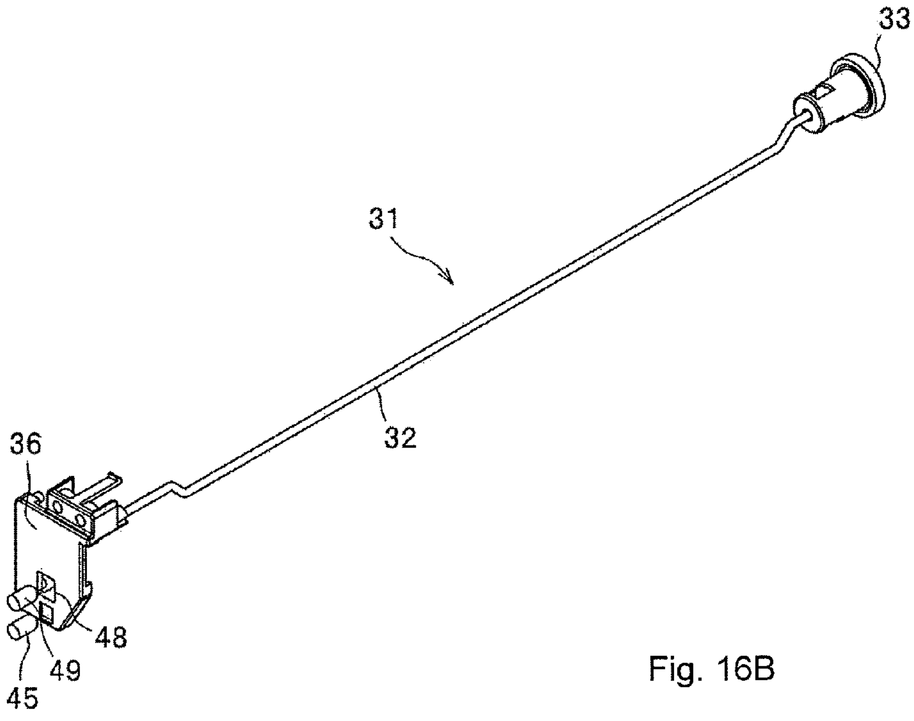
Figure 16C:
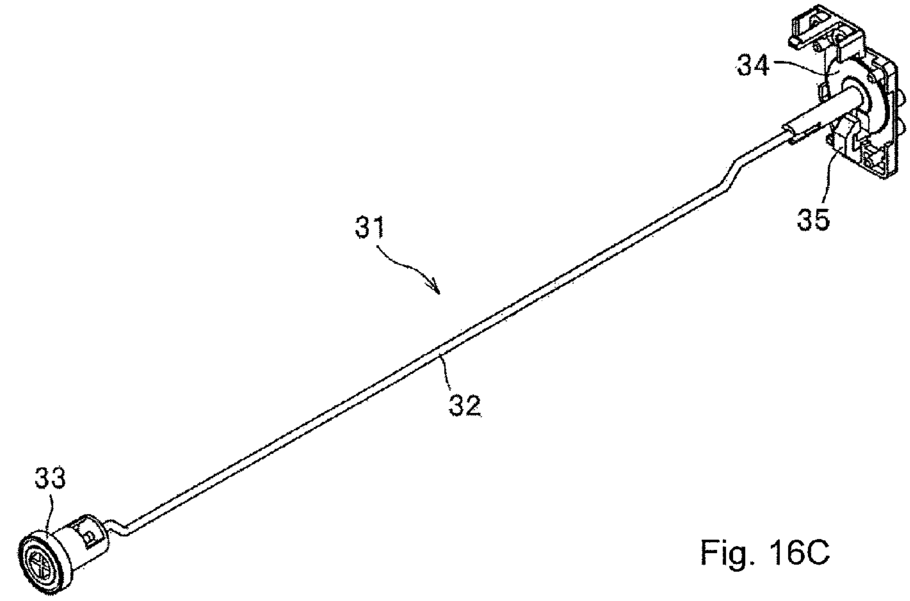

As shown in FIGS. 16A to 16C, the light irradiated from the light emitting element 45 provided in the image forming apparatus 100 enters from the entrance part 46 of the light guiding path 35 (see FIG. 20) and exits from the exit part 47 after the direction is changed by the light guiding path 35. The light that has exited is transmitted to the light receiving part 49 provided in the image forming apparatus 100 through the hole part 48 of the cover 36. Here, there is the light blocking plate 34 between the cover 36 and the exit part 47 (see FIG. 20). The disc part 41 of the light blocking part 34 blocks the light by covering the hole part 48 of the cover 36. The light is guided when the U-shape part 39 (see FIGS. 18A to 18C) of the disc part 41 reaches between the cover and the exit part 47.

The light receiving element 49 transmits, to the controller 99, the light receiving signal that indicates that the light has been transmitted. The controller 99 determines the remaining amount of toner using the light receiving signal that indicates that the light received from the light receiving element 49 has been transmitted.

On the other hand, depending on the slide position of the second shutter 58 of the toner cartridge 5, when the first shutter member 57 of the development unit 23 is at the position at which the first shutter member 57 has not completely slid as shown in FIG. 13, the hook part 79 of the link member 64 is at a position at which the hook part 79 has not hooked on the link holding part 63 of the first shutter member 57. Because the link member 64 is biased by the compression coil spring 65, the link member 64 does not slide in the α1 direction.

In this case, because the coupling gear 51 that slides in the α1 direction by linking with the link member 64 does not slide either, the first coupling part 53 is not coupled with the second coupling part 54 of the rotational shaft 52, and thereby the drive force is not transmitted to the drive gear 33. In addition, because the drive gear 33 does not rotate, the agitation part 32 and the light blocking plate 34 do not rotate together. Therefore, the light irradiated from the light emitting element 45 provided in the image forming apparatus 100 to the light receiving element 49 either continues to be blocked by the disc part 41 or to be guided by (passes through) the U-shape part 39.

If the operation of irradiation or blocking of the light to the light receiving element 49 continues and if the rotation period T of the agitation part 32 elapses, the controller 99 determines that the second shutter member 58 of the toner cartridge 5 is not accurately opened, stops the operation of the development unit 23 and displays an alarm. In addition, as shown in FIG. 14, if the first coupling part 53 of the coupling gear 51 and the rotational shaft 52, and the second coupling part 54 are at non-engagement positions even if the hook part 79 of the link member 64 are hooked on the link holding part of the first shutter member 57, the controller 99 similarly stops the operation of the development unit 23 and displays the alarm. This completes the explanation of the operation to transmit the drive force to the remaining toner amount detection mechanism 31 as the detection mechanism.

As described above, the image forming apparatus 100 according to the first embodiment does not directly read the position of the first shutter member 57 by a sensor but uses the simple drive force transmission mechanism 98 and the remaining toner amount detection mechanism 31 for detecting the toner amount to determine the position of the first shutter member 57. As a result, the image forming apparatus 100 is produced at a lower cost than an image forming apparatus that directly reads the position of the first shutter member 57 by a sensor.

Moreover, the image forming apparatus 100 according to the first embodiment is prevented from performing the print operation in a state where the second shutter member 58 of the toner cartridge 5 has not slid and thus the toner 4 cannot be supplemented from the toner cartridge 5. Therefore, occurrence of thin print due to insufficient amount of toner is prevented.

Moreover, the image forming apparatus 100 according to the first embodiment is prevented from performing the print operation in a state where the toner 4 is not sufficiently supplemented from the toner cartridge 5 due to the sliding of the second shutter member 58 of the toner cartridge 5 not being enough. Therefore, occurrence of the thin print due to untimely supplementation of the toner during the print operation is prevented.

Furthermore, the image forming apparatus 100 needs to be idled immediately after the replacement of the toner cartridge until the toner is sufficiently filled up. In that case, in the conventional image forming apparatus that is incapable of reading the shutter position of the development unit, the toner is not filled in the development unit when the shutter is not open, causing the toner to be empty and an alarm for toner replacement to be displayed. However, the image forming apparatus 100 according to the first embodiment determines the position of the first shutter member 57. As a result, occurrence of similar phenomena is prevented. That is, the image forming apparatus 100 according to the first embodiment determines a case where the toner 4 cannot be supplemented in the development unit 23 because the amount of toner 4 in the toner cartridge 5 is low and a case where the toner 4 cannot be supplemented in the development unit 23 because the second shutter member 58 of the toner cartridge 5 is not accurately opened.

Second Embodiment

Configuration of Image Forming Apparatus According to Second Embodiment

Figure 26A:
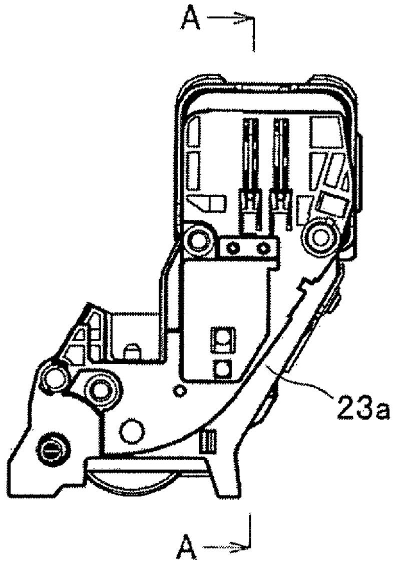
FIG. 26A is a side view.
Figure 26B:
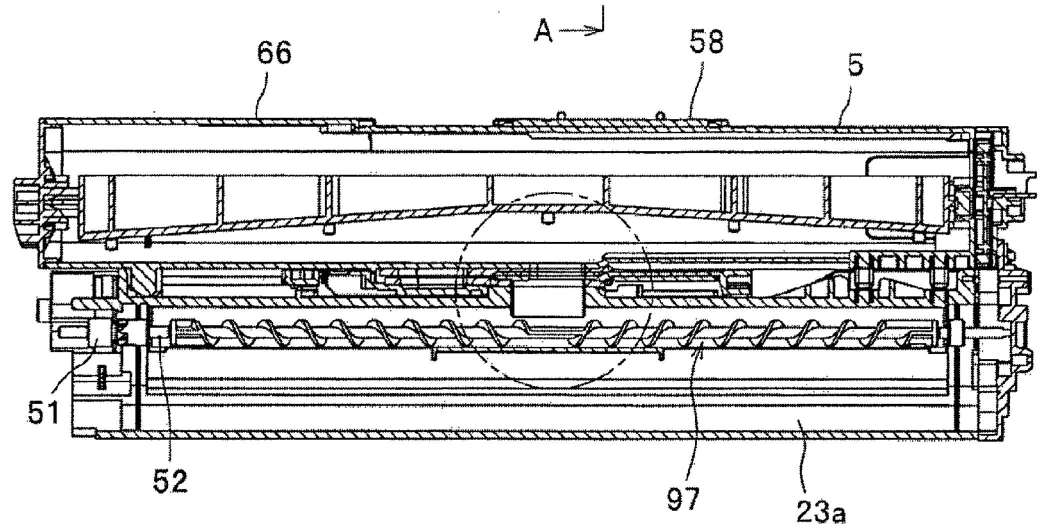
FIG. 26B is a vertically cross-sectional view.
Figure 26C:
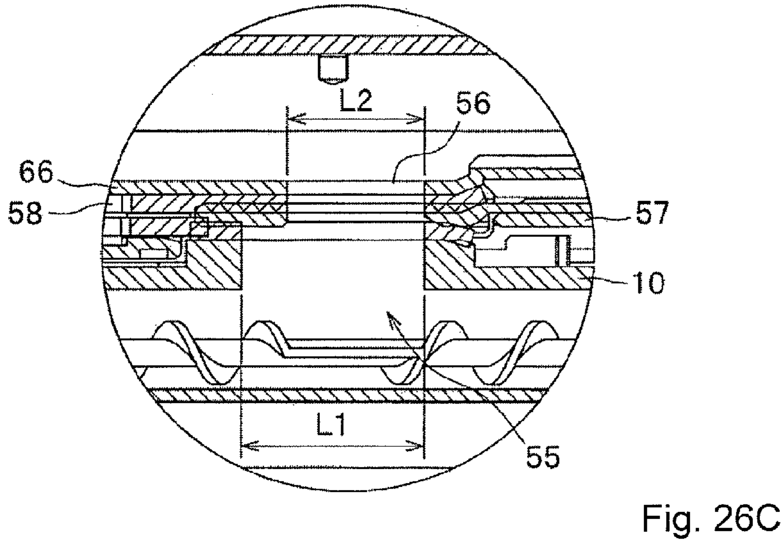
FIG. 26C is a main part enlarged vertically cross-sectional view of the development device according to a second embodiment.
Figure 27:
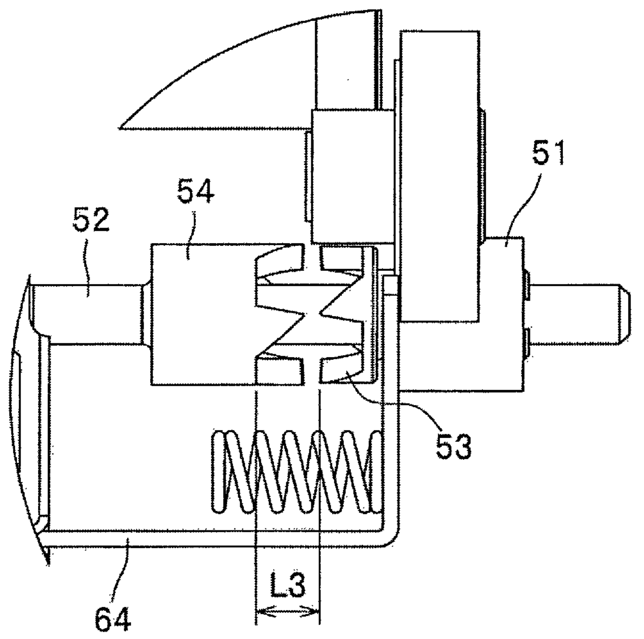
FIG. 27 is a main part enlarged top view of the development device according to the second embodiment.

Of a configuration of an image forming apparatus 100*a* according to a second embodiment, those different from the image forming apparatus 100 according to the first embodiment are explained below with reference to FIGS. 26 and 27. FIG. 26 is a side view and a vertically cross-sectional view of the development unit 23*a* as the development device according to the second embodiment. FIG. 27 is a main part enlarged top view of the development unit 23*a* as the development device according to the second embodiment.

In the development unit 23*a* according to the second embodiment, when a width of the first toner supply opening 55 of the development unit 23*a* and a width of the second toner supply opening 56 of the toner cartridge 5 with respect to the movement direction of first shutter member 57 provided on the development unit 23*a* and the second shutter member 28 provided on the toner cartridge 5 are L1 and L2, respectively, as shown in FIG. 26, and when a movable amount of the coupling gear 51, which is a length of an engagement amount of the first coupling part 53 provide on the coupling gear 51 and the second coupling part 54 provided on the rotational shaft 52 and a gap amount between the first coupling part 53 and the second coupling part 54 in a state where the first shutter member 57 is fully closed as shown in FIG. 27, is L3, a size relationship of L1 to L3 is L1−L2>L3. The toner cartridge 5 and the development unit 23*a* may be collectively referred to as an image forming unit. In addition, in the present embodiment, a developer accommodation unit configures a part of the development unit 23*a*.

Operation of Image Forming Apparatus According to Second Embodiment

Of operations of the image forming apparatus according to the second embodiment, those different from the image forming apparatus according to the first embodiment are explained below with reference to FIGS. 26 to 29.

(Operation to Transmit Drive Force to Detection Mechanism)

Figure 28A:
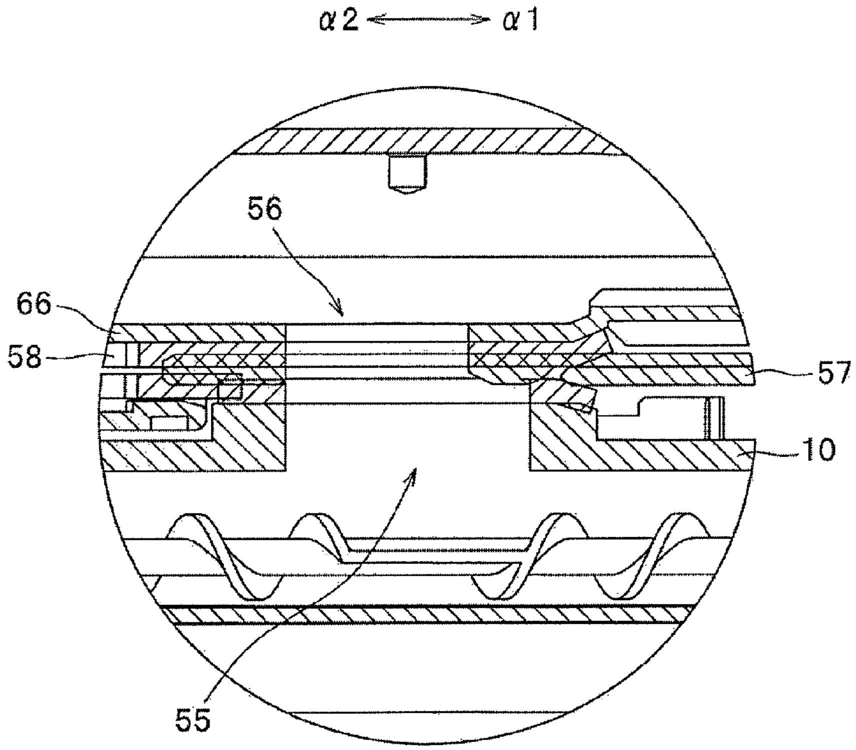
FIG. 28A is a main part enlarged vertically cross-sectional view of the development device and FIG. 28B is a diagram for explaining the drive force transmission mechanism (in a state where the coupling parts do not engage with each other) according to the second embodiment.
Figure 28B:
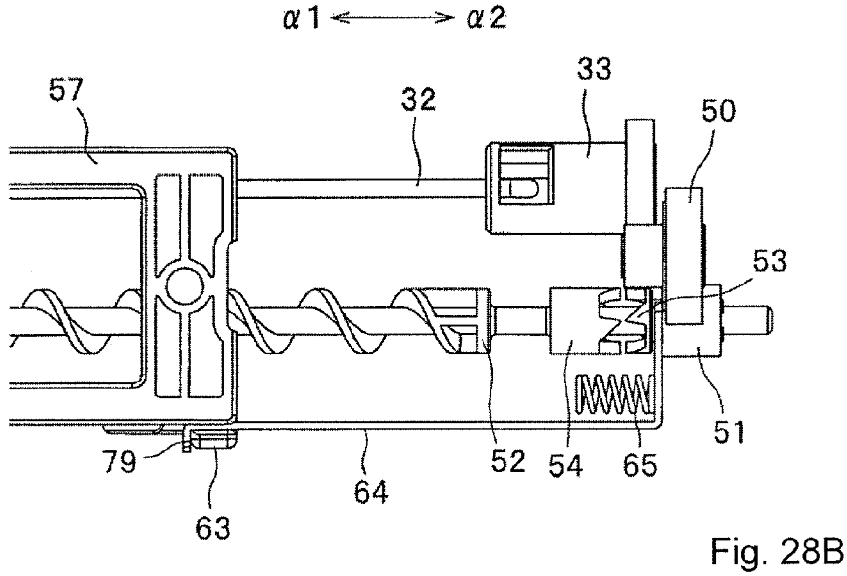

As the toner cartridge 5 is installed, the second shutter member 58 of the toner cartridge 5 slides in the α1 direction, and the first shutter member 57 of the development unit 23*a* simultaneously slides in the α1 direction. When the first shutter member 57 slides by a certain length, the link holding part 63 of the first shutter member 57 contacts the hook part 79 of the link member 64, causing the link member 64 to start sliding as shown in FIGS. 28A and 28B. As the link member 64 slides, the coupling gear 51 also starts sliding and moving.

Here, in the development unit 23*a* according to the second embodiment, when a width of the first toner supply opening 55 of the development unit 23*a* and a width of the second toner supply opening 56 of the toner cartridge 5 with respect to the movement direction of first shutter member 57 and the second shutter member 28 are L1 and L2, respectively, as shown in FIG. 26, and when a movable amount of the coupling gear 51, which is a length of an engagement amount of the first coupling part 53 and the second coupling part 54 and a gap amount between the first coupling part 53 and the second coupling part 54 in a state where the first shutter member 57 is fully closed as shown in FIG. 27, is L3, a size relationship of L1 to L3 is L1−L2>L3. Therefore, as shown in FIGS. 28A and 28B, even if the first coupling part 53 and the second coupling part 54 are not in engagement with each other, the second toner supply opening 56 of the toner cartridge 5 fully overlaps with the first toner supply opening 55 of the development unit 23*a*, allowing communication therebetween.

Figure 29A:
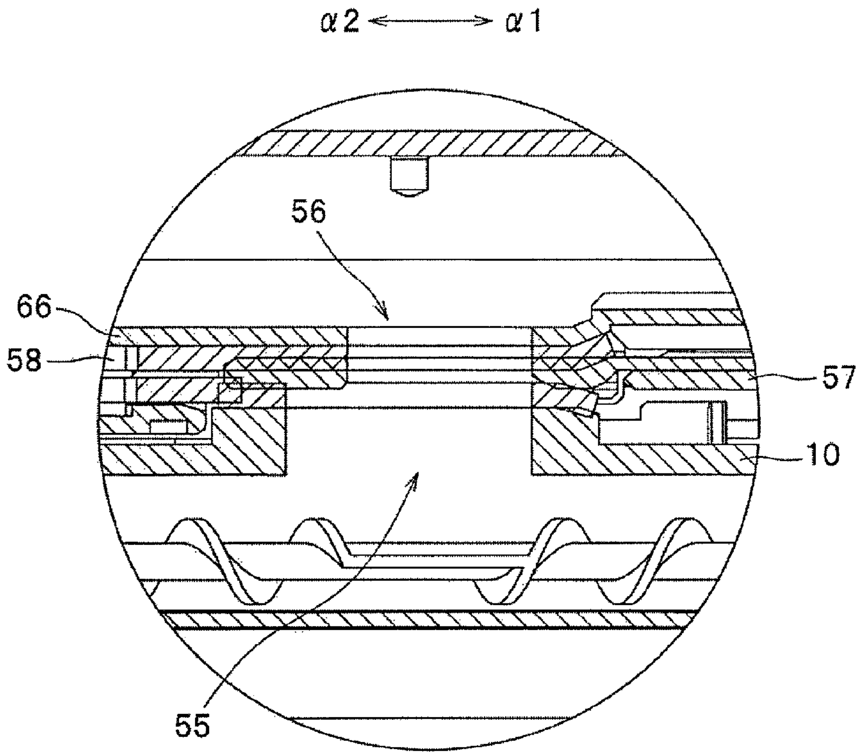
FIG. 29A is a main part enlarged vertically cross-sectional view of the development device and FIG. 29B is a diagram for explaining the drive force transmission mechanism (in a state where the coupling parts engage with each other) according to the second embodiment.
Figure 29B:
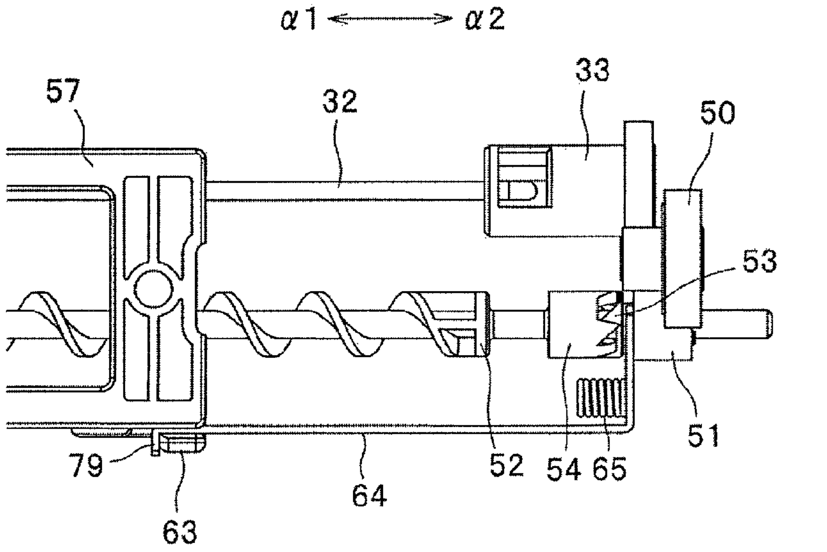
Figure 30:
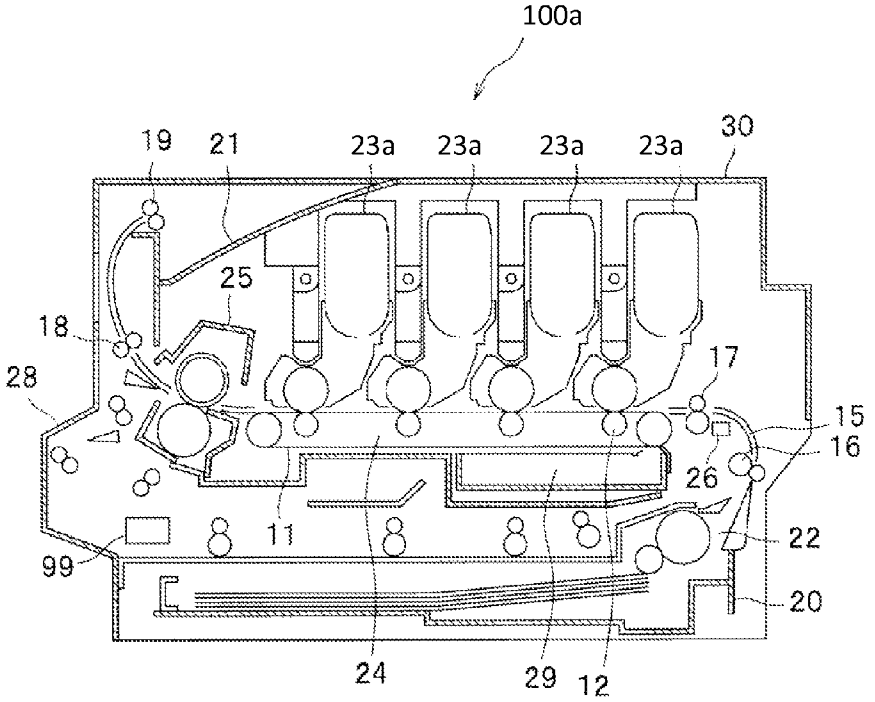
FIG. 30 is a vertical cross-sectional view (schematic) of an image forming apparatus according to the second embodiment.

Next, when the first shutter member 57 of the development unit 23*a* is further slid in the α1 direction from the state shown in FIGS. 28A and 28B, the first coupling part 53 of the coupling gear 51 engages with the second coupling part 54 of the rotational shaft 52 as shown in FIGS. 29A and 29B. The slide movement of the first shutter member 57 of the development unit 23*a* is regulated by the movement amount regulation part (not shown) thereafter, and at the same time, the movement of the second shutter member 58 of the toner cartridge 5 is also stopped.

Because the first toner supply opening 55 of the development unit 23*a* and the second toner supply opening 56 of the toner cartridge 5 are in the size relationship of L1−L2>L3, the first toner supply opening 55 and the second toner supply opening 56 reliably overlap with each other in a region where the first coupling member 53 and the second coupling member 54 engage with each other. This completes the operation to transmit the drive force to the remaining toner amount detection mechanism 31 as the detection mechanism.

As described above, with the development unit 23*a* included in the image forming apparatus 100*a* according to the second embodiment, the first toner supply opening 55 and the second toner supply opening 56 reliably overlap with each other in the slide direction of the first shutter member 57 and the second shutter member 58 when the transmission of the drive force to the remaining toner amount detection mechanism 31 starts, allowing the communication therebetween. As a result, a failure in supplying the toner from the toner cartridge 5 is prevented, allowing a secured print quality level by stable supply of toner.

Exemplary Modifications

The embodiments of the present application are described above. However, the present application is not limited to the embodiments but may be achieved without departing from its object. Below are exemplary modifications of the embodiments.

(Image Forming Apparatus)

In the first and second embodiments, the image forming apparatuses 100 and 100*a* are explained with an assumption of color printers. However, in addition to the color printers, the present embodiments may be applied in other printers, facsimile devices, photocopy machines and devices that include multiple functions.

(Remaining Toner Amount Detection Mechanism)

The remaining toner detection mechanism 31 according to the first and second embodiments is configured to include the light blocking plate 34 and the light guiding path 35. However, the remaining toner amount detection mechanism 31 may be configure to exclude the light guiding path 35 and to attach a reflection plate on the agitation part 32 instead of the light blocking plate 34, so that the reflection plate reflects the light from the light emitting element 45 to the light receiving element 49. In this case, the controller 99 can detect the toner amount in the development units 23 and 23*a* and the position of the first shutter member 57 based on the time during which the light receiving element 49 detects the light. Therefore, there are advantages similar to those achieved in the first and second embodiments.

(Drive Force Transmission Mechanism)

The first coupling part 53 and the second coupling part 54 of the drive force transmission mechanism 98 according to the first and second embodiments includes claw that have an approximately triangular shape and that are configured as a jaw clutch. However, the claws may be in other configurations. For example, the jaw clutch may be configured by rectangular claws, trapezoidal claws, spiral claws and the like. Alternatively, a friction clutch may be used.

In the above explanation of the first and second embodiments, the toner accommodation part P is formed in the development unit 23 or 23*a* (see FIG. 4). However, the toner accommodation part P may be formed in the toner cartridge 5. In that case, mechanisms similar to the above-describe drive force transmission mechanism 98, remaining toner amount detection mechanism 31, and a toner supply opening (or developer supply opening) may be provided inside the toner cartridge 5. The detection of the toner amount and the determination of the position of the second shutter member 58 may be performed by similar methods. In addition, based on such formation, the toner cartridge 5 configures a developer accommodation unit.

What is claimed is:

1. A developer accommodation unit, comprising:

a developer accommodation part that accommodates a developer;

an opening part that communicates with the developer accommodation part;

a shutter member that is configured to be movable between an opened position and a closed position with respect to the opening part, wherein when the shutter member is located in the closed position, the developer is blocked by the shutter member from moving into the accommodation part;

a rotation body that is provided rotatable in the developer accommodation part; and a drive force transmission mechanism that transmits a drive force supplied from an outside of the developer accommodation unit to the rotation body so that the rotation body rotates, wherein the drive force transmission mechanism includes an engagement mechanism by which the drive force transmitted to the rotation body when the shutter member is in the opened position.

2. The developer accommodation unit according to claim 1, wherein the engagement mechanism is configured to be changeable between an engagement state and a disengagement state, and the engagement mechanism is in the disengagement state when the shutter member is in the closed position.

3. The developer accommodation unit according to claim 1, wherein the engagement mechanism further comprises a link member that moves the engagement mechanism between the engagement state and the disengagement state.

4. The developer accommodation unit according to claim 3, wherein the link member includes:

an engagement part that engages with the shutter member, and a work part that causes the engagement mechanism to move.

5. The developer accommodation unit according to claim 4, wherein the engagement part engages with the shutter member while the shutter member is moving to the opened position from the closed position.

6. The developer accommodation unit according to claim 1, wherein the engagement mechanism includes:

a first drive force transmission member provided in a downstream of the transmission of the drive force, and a second drive force transmission member provided in an upstream of the transmission of the drive force.

7. The developer accommodation unit according to claim 6, wherein when the shutter member moves to the opened position, the first drive force transmission member moves toward the second drive force transmission member, causing the engagement of the first drive force transmission member and the second drive force transmission member.

8. The developer accommodation unit according to claim 1, wherein the engagement mechanism includes:

a first drive force transmission member that moves when the shutter member moves to the opened position from the closed position, and a second drive force transmission member that engages with the first drive force transmission member upon the movement of the first drive force transmission member.

9. The developer accommodation unit according to claim 1, wherein the developer is supplied to the developer accommodation part through the opening part, and when the shutter member is located in the opened position, the developer is capable of moving to the developer accommodation part through the opening part.

10. The developer accommodation unit according to claim 9, wherein the drive force is transmitted to the rotation body by the engagement mechanism only when the shutter member is in the opened position.

11. A development device, comprising:

the developer accommodation unit according to claim 1;

a developer carrier that carries the developer; and a supply member that supplies the developer in the developer accommodation part to the developer carrier.

12. An image forming unit, comprising:

the developer accommodation unit according to claim 1;

a developer supply container;

a developer carrier that carries the developer; and a supply member that supplies the developer in the developer accommodation part to the developer carrier.

13. An image forming apparatus, comprising:

a supply cassette that holds and supplies a sheet, the developer accommodation unit according to claim 1;

a photosensitive body that forms an electrostatic latent image;

a developer carrier that carries the developer supplied from the developer accommodation unit and forms a developer image on the photosensitive body, and a fuser that fuses the developer image on the sheet.

14. An image forming unit, comprising:

a developer supply container that accommodates a developer;

a development device that accommodates the developer supplied from the developer supply container;

a communication part which is provided between the developer supply container and the development device and through which the developer passes from the developer supply container to the development device; and a shutter mechanism that opens and closes the communication part, wherein the development device includes:

a rotation body that is provided rotatably, and a drive force transmission mechanism that transmits a drive force to the rotation body, wherein the drive force transmission mechanism includes an engagement mechanism by which the drive force is transmitted to the rotation body when the shutter member opens the communication part.

15. The image forming unit according to claim 14, wherein the engagement mechanism releases the engagement when the shutter mechanism closes the communication part.

16. The image forming unit according to claim 14, wherein the engagement mechanism further comprises a link member that causes the engagement mechanism to open the communication part and to close the communication part in correspondence with the shutter mechanism.

17. The image forming unit according to claim 14, wherein the developer supply container includes:

a supply opening, and a supply opening shutter that opens and closes the supply opening, and the engagement mechanism is configured to be changeable between an engagement state and a disengagement state, and to turn the engagement state when the supply opening shutter opens the supply opening.

18. The image forming unit according to claim 17, wherein the development device includes a movement member that engages with the supply opening shutter and that moves in correspondence with the movement of the supply opening shutter, and the engagement mechanism turns to the engagement state when the movement member moves.

19. The image forming unit according to claim 18, wherein the movement member includes:

an accommodation opening shutter that opens and closes an accommodation opening provided in the development device, and a link member that causes the engagement mechanism to move when the accommodation opening shutter opens.

20. A developer accommodation unit, comprising:

a controller;

a developer accommodation part that accommodates a developer;

a shutter member that opens and closes the developer accommodation part;

a rotation body provided rotatable in the developer accommodation part; and a drive force transmission mechanism that transmits a drive force to the rotation body when the developer accommodation part is open, wherein the rotation body free-falls from a top of rotation to a surface of the developer after the drive force transmission mechanism causes the rotation body to rotate and reach the top of rotation, and the controller determines a remaining toner amount by calculating time of the drive force transmission mechanism from the top of rotation to the rotation body on the surface of the developer after the free-fall.

21. The image forming apparatus according to claim 20, further comprising:

a light emitting element that emits light; and a light receiving element that receives the light emitted from the light receiving element, wherein the rotation body includes a disc member having a section that allows the light to travel from the light emitting element to the light receiving element, and the controller calculates the time based on the light received by the light receiving element.

* * * * *